(12) United States Patent
Chang et al.

(10) Patent No.: US 12,481,471 B2
(45) Date of Patent: Nov. 25, 2025

(54) ELECTRONIC DEVICE FOR SHARING SCREEN WITH EXTERNAL DEVICE AND METHOD FOR CONTROLLING THE SAME

(71) Applicant: Samsung Electronics Co., Ltd., Suwon-si (KR)

(72) Inventors: Ilku Chang, Suwon-si (KR); Hayeon Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/484,763

(22) Filed: Oct. 11, 2023

(65) Prior Publication Data

US 2024/0118856 A1 Apr. 11, 2024

Related U.S. Application Data

(63) Continuation of application No. PCT/KR2023/015530, filed on Oct. 10, 2023.

(30) Foreign Application Priority Data

Oct. 11, 2022 (KR) .......................... 10-2022-0129442
Nov. 30, 2022 (KR) .......................... 10-2022-0164028

(51) Int. Cl.
   *G06F 3/14* (2006.01)
(52) U.S. Cl.
   CPC .................................. *G06F 3/1454* (2013.01)
(58) Field of Classification Search
   None
   See application file for complete search history.

(56) References Cited

U.S. PATENT DOCUMENTS

| 9,690,538 B1 * | 6/2017 | Doyle, III | ............. H04W 4/023 |
| 2013/0304817 A1 * | 11/2013 | Hu | ................... H04N 21/41407 |
| | | | 709/204 |

(Continued)

FOREIGN PATENT DOCUMENTS

| EP | 3531659 A1 * | 8/2019 | ........... G06F 3/1454 |
| KR | 10-1218294 B1 | 1/2013 | |

(Continued)

OTHER PUBLICATIONS

International Search Report dated Jan. 8, 2024, issued in International Patent Application No. PCT /KR2023/015530.

*Primary Examiner* — Temesghen Ghebretinsae
(74) *Attorney, Agent, or Firm* — Jefferson IP Law, LLP

(57) ABSTRACT

An electronic device is provided. The electronic device includes a communication module, a display, and at least one processor operatively connected to the communication module and the display, wherein the at least one processor is configured to, in a state that full screen information on, for mirroring, a full screen displayed on the display is transmitted to an external device via the communication module, identify whether at least one configured condition is satisfied, based on an event occurring, and based on the at least one configured condition being satisfied, transmit, to the external device, information on an execution screen of at least one application among execution screens of applications being displayed on the display, in replacement of the full screen information so as to mirror only the execution screen of the application.

16 Claims, 16 Drawing Sheets

(56) References Cited

U.S. PATENT DOCUMENTS

| | | | |
|---|---|---|---|
| 2014/0359493 A1* | 12/2014 | Hong | G06F 3/1454 |
| | | | 715/761 |
| 2015/0326655 A1 | 11/2015 | Quan et al. | |
| 2016/0182613 A1* | 6/2016 | Brune | H04N 21/41415 |
| | | | 709/217 |
| 2017/0148307 A1 | 5/2017 | Yeom et al. | |
| 2017/0201790 A1 | 7/2017 | Oh et al. | |
| 2017/0220311 A1 | 8/2017 | Oh et al. | |
| 2018/0343492 A1 | 11/2018 | Konig et al. | |
| 2020/0057596 A1* | 2/2020 | Kim | G06F 3/147 |
| 2020/0111394 A1* | 4/2020 | Rakshit | G09G 5/12 |
| 2020/0394086 A1 | 12/2020 | Lee | |
| 2021/0097208 A1* | 4/2021 | Donahue | G06F 21/84 |
| 2023/0020913 A1* | 1/2023 | Yoon | H04M 1/72412 |
| | | | 345/2.2 |
| 2023/0164262 A1 | 5/2023 | Yoon et al. | |
| 2023/0409273 A1* | 12/2023 | He | G09G 5/14 |

FOREIGN PATENT DOCUMENTS

| | | |
|---|---|---|
| KR | 10-2014-0140957 A | 12/2014 |
| KR | 10-2017-0007980 A | 1/2017 |
| KR | 10-2017-0035487 A | 3/2017 |
| KR | 10-2017-0060480 A | 6/2017 |
| KR | 10-2017-0083360 A | 7/2017 |
| KR | 10-2017-0084810 A | 7/2017 |
| KR | 10-2017-0090291 A | 8/2017 |
| KR | 10-2020-0142314 A | 12/2020 |
| KR | 10-2022-0012142 A | 2/2022 |

* cited by examiner

ELECTRONIC DEVICE FOR SHARING SCREEN WITH EXTERNAL DEVICE AND METHOD FOR CONTROLLING THE SAME

CROSS-REFERENCE TO RELATED APPLICATION(S)

This application is a continuation application, claiming priority under § 365(c), of an International application No. PCT/KR2023/015530, filed on Oct. 10, 2023, which is based on and claims the benefit of a Korean patent application number 10-2022-0129442, filed on Oct. 11, 2022, in the Korean Intellectual Property Office, and of a Korean patent application number 10-2022-0164028, filed on Nov. 30, 2022, in the Korean Intellectual Property Office, the disclosure of each of which is incorporated by reference herein in its entirety.

TECHNICAL FIELD

The disclosure relates to an electronic device for sharing a screen with an external device and a method of controlling same.

BACKGROUND ART

The number of various services and additional functions provided by an electronic device, for example, a portable electronic device, such as a smartphone, is gradually increasing. In order to enhance the utility of such an electronic device and satisfy the demands of various users, communication service providers or electronic device manufacturers are providing various functions and competitively developing electronic devices to differentiate themselves from other companies. Accordingly, various functions provided by the electronic devices are gradually advancing.

When a user enjoys web surfing or uses multimedia functions, using an electronic device outputting a larger screen may be more convenient. A larger display may be mounted in an electronic device to output a larger screen. However, based on portability of the electronic device, there may be a limit to expansion of the display size.

Due to this limitation, a mirroring function of transmitting a display screen of a first device (source) to a second device (sink) to share the screen of the first device is used.

The mirroring function allows the screen of a mobile terminal to be shared with an external device, such as a television (TV) or monitor as it is, and thus exposed via the external device without change. Therefore, it is difficult to protect a user's privacy, and when the screen is shared, using other functions with the mobile terminal is practically impossible without interrupting a person's watching the shared screen.

When notification is configured not to be displayed during mirroring for privacy protection, an important notification may be missed.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Solution

Aspects of the disclosure are to address at least the above-mentioned problems and/or disadvantages and to provide at least the advantages described below. Accordingly, an aspect of the disclosure is to provide an electronic device for sharing a screen with an external device and a method of controlling same.

Additional aspects will be set forth in part in the description which follows and, in part, will be apparent from the description, or may be learned by practice of the presented embodiments.

In accordance with an aspect of the disclosure, an electronic device is provided. The electronic device includes a communication module, a display, and at least one processor operatively connected to the communication module and the display.

According to an embodiment of the disclosure, the at least one processor may be configured to, in a state where full screen information on, for mirroring, a full screen displayed on the display is transmitted to an external device via the communication module, identify whether at least one configured condition is satisfied, based on that an event has occurred.

According to an embodiment of the disclosure, the at least one processor may be configured to, based on that the at least one configured condition is satisfied, transmit, to the external device, information on an execution screen of at least one application among execution screens of applications being displayed on the display, in replacement of the full screen information so as to mirror only the execution screen of the application.

According to an embodiment of the disclosure, the electronic device further includes a memory.

According to an embodiment of the disclosure, the at least one processor may be configured to identify that the at least one configured condition is satisfied, based on that information on a sender of a message or a mail related to the event matches information on a contact stored in the memory.

According to an embodiment of the disclosure, the at least one processor may be configured to identify that the at least one configured condition is satisfied, based on that there is a history of contacting a sender of a message or a mail related to the event within a configured period before the occurrence of the event.

According to an embodiment of the disclosure, the at least one processor may be configured to receive information on people in front of the external device, which is obtained via a camera of the external device, from the external device via the communication module, based on that the event has occurred.

According to an embodiment of the disclosure, the at least one processor may be configured to identify that the at least one configured condition is satisfied, based on that the number of the people is a configured value or greater and/or a person with a low intimacy level is included therein, based on the information on the people.

According to an embodiment of the disclosure, the at least one processor may be configured to identify that the at least one configured condition is satisfied, based on that a user input related to the event is out of the execution screen of the application being displayed.

According to an embodiment of the disclosure, the at least one processor may be configured to, in a state where notification is configured not to be displayed during a mirroring operation, identify that the at least one configured condition is satisfied, based on that a pre-configured number of events have consecutively occurred.

According to an embodiment of the disclosure, the external device may be a first external device.

According to an embodiment of the disclosure, the at least one processor may be configured to, based on that a command for mirroring only the execution screen of the application being displayed on the display to the first external device is received from a second external device connected via the communication module after the occurrence of the event, identify that the at least one configured condition is satisfied.

According to an embodiment of the disclosure, the at least one processor may be configured to, in a state where notification is configured to be displayed during a mirroring operation, transmit a screen including a notification to the external device, based on that the event has occurred.

According to an embodiment of the disclosure, the at least one processor may be configured to transmit the information on the execution screen of the application being displayed on the display to the external device so as to mirror only the execution screen of the application.

According to an embodiment of the disclosure, the at least one processor may be configured to display a user interface that recommends to mirror only the execution screen of the application being displayed on the display, based on that the at least one configured condition is satisfied.

According to an embodiment of the disclosure, the at least one processor may be configured to, based on that a user input for mirroring only the execution screen of the application being displayed on the display is received through the user interface, transmit the information on the execution screen of the application to the external device in replacement of the full screen information.

According to an embodiment of the disclosure, the at least one processor may be configured to change the execution screen of the application being displayed as the full screen to a pop-up screen, based on that the at least one configured condition is satisfied.

According to an embodiment of the disclosure, the at least one processor may be configured to transmit only the information on the execution screen of the application displayed on the pop-up screen to the external electronic device.

In accordance with another aspect of the disclosure, a method of controlling an electronic device is provided. The method includes, in a state where full screen information on, for mirroring, a full screen displayed on a display is transmitted to an external device via a communication module, identifying whether at least one configured condition is satisfied, based on that an event has occurred.

According to an embodiment of the disclosure, the method of controlling the electronic device includes, based on that the at least one configured condition is satisfied, transmitting, to the external device, information on an execution screen of an application being displayed on the display, in replacement of the full screen information so as to mirror only the execution screen of the application.

According to an embodiment of the disclosure, the identifying of whether the at least one configured condition is satisfied includes identifying that the at least one configured condition is satisfied, based on that information on a sender of a message or a mail related to the event matches information on a contact stored in a memory.

According to an embodiment of the disclosure, the identifying of whether the at least one configured condition is satisfied includes identifying that the at least one configured condition is satisfied, based on that there is a history of contacting a sender of a message or a mail related to the event within a configured period before the occurrence of the event.

According to an embodiment of the disclosure, the identifying of whether the at least one configured condition is satisfied includes receiving information on people in front of the external device, which is obtained via a camera of the external device, from the external device via the communication module, based on that the event has occurred.

According to an embodiment of the disclosure, the identifying of whether the at least one configured condition is satisfied includes identifying that the at least one configured condition is satisfied, based on that the number of the people is a configured value or greater and/or a person with a low intimacy level is included therein, based on the information on the people.

According to an embodiment of the disclosure, the identifying of whether the at least one configured condition is satisfied includes identifying that the at least one configured condition is satisfied, based on that a user input related to the event is out of the execution screen of the application being displayed.

According to an embodiment of the disclosure, the identifying of whether the at least one configured condition is satisfied includes, in a state where notification is configured not to be displayed during a mirroring operation, identifying that the at least one configured condition is satisfied, based on that a pre-configured number of events have consecutively occurred.

According to an embodiment of the disclosure, the external device may be a first external device.

According to an embodiment of the disclosure, the identifying of whether the at least one configured condition is satisfied includes identifying that the at least one configured condition is satisfied, based on that a command for mirroring only the execution screen of the application being displayed on the display to the first external device is received from a second external device connected via the communication module after the occurrence of the event.

According to an embodiment of the disclosure, the method of controlling the electronic device further includes, in a state where notification is configured to be displayed during a mirroring operation, transmitting a screen including a notification to the external device, based on that the event has occurred.

According to an embodiment of the disclosure, the transmitting of the information on the execution screen of the application to the external device includes, after transmitting the screen including the notification to the external device, transmitting information on an execution screen of at least one application among execution screens of applications being displayed on the display to the external device so as to mirror only the execution screen of the application.

According to an embodiment of the disclosure, the method of controlling the electronic device further includes displaying a user interface that recommends to mirror only the execution screen of the application being displayed on the display, based on that the at least one configured condition is satisfied.

According to an embodiment of the disclosure, the transmitting of the information on the execution screen of the application to the external device includes, based on that a user input for mirroring only the execution screen of the application being displayed on the display is received through the user interface, transmitting the information on the execution screen of the application to the external device in replacement of the full screen information.

According to an embodiment of the disclosure, the method of controlling the electronic device further includes changing the execution screen of the application being displayed as the full screen to a pop-up screen, based on that the at least one configured condition is satisfied.

According to an embodiment of the disclosure, the transmitting of the information on the execution screen of the application to the external device includes transmitting only the information on the execution screen of the application displayed on the pop-up screen to the external electronic device.

According to an embodiment of the disclosure, in a non-transitory computer-readable recording medium for storing one or more programs, the one or more programs includes instructions causing the electronic device to, in a state where full screen information on, for mirroring, a full screen displayed on the display is transmitted to an external device via the communication module, identify whether at least one configured condition is satisfied, based on that an event has occurred.

According to an embodiment of the disclosure, the one or more programs includes instructions causing the electronic device to, based on that the at least one configured condition is satisfied, transmit, to the external device, information on an execution screen of an application being displayed on the display, in replacement of the full screen information so as to mirror only the execution screen of the application.

According to an embodiment of the disclosure, the electronic device further includes a memory.

According to an embodiment of the disclosure, the one or more programs includes instructions causing the electronic device to identify that the at least one configured condition is satisfied, based on that information on a sender of a message or a mail related to the event matches information on a contact stored in the memory.

According to an embodiment of the disclosure, the one or more programs includes instructions causing the electronic device to identify that the at least one configured condition is satisfied, based on that there is a history of contacting a sender of a message or a mail related to the event within a configured period before the occurrence of the event.

According to an embodiment of the disclosure, the one or more programs includes instructions causing the electronic device to receive information on people in front of the external device, which is obtained via a camera of the external device, from the external device via the communication module, based on that the event has occurred.

According to an embodiment of the disclosure, the one or more programs includes instructions causing the electronic device to identify that the at least one configured condition is satisfied, based on that the number of the people is a configured value or greater and/or a person with a low intimacy level is included therein, based on the information on the people.

According to an embodiment of the disclosure, the one or more programs includes instructions causing the electronic device to identify that the at least one configured condition is satisfied, based on that a user input related to the event is out of the execution screen of the application being displayed.

According to an embodiment of the disclosure, the one or more programs includes instructions causing the electronic device to, in a state where notification is configured not to be displayed during a mirroring operation, identify that the at least one configured condition is satisfied, based on that a pre-configured number of events have consecutively occurred.

According to an embodiment of the disclosure, the external device may be a first external device.

According to an embodiment of the disclosure, the one or more programs includes instructions causing the electronic device to identify that the at least one configured condition is satisfied, based on that a command for mirroring only the execution screen of the application being displayed on the display to the first external device is received from a second external device connected via the communication module after the occurrence of the event.

According to an embodiment of the disclosure, the one or more programs includes instructions causing the electronic device, in a state where notification is configured to be displayed during a mirroring operation, transmit a screen including a notification to the external device, based on that the event has occurred.

According to an embodiment of the disclosure, the one or more programs includes instructions causing the electronic device to transmit information on an execution screen of at least one application among execution screens of applications being displayed on the display to the external device so as to mirror only the execution screen of the application.

According to an embodiment of the disclosure, the one or more programs includes instructions causing the electronic device to display a user interface that recommends to mirror only the execution screen of the application being displayed on the display, based on that the at least one configured condition is satisfied.

According to an embodiment of the disclosure, the one or more programs includes instructions causing the electronic device to, based on that a user input for mirroring only the execution screen of the application being displayed on the display is received through the user interface, transmit the information on the execution screen of the application to the external device in replacement of the full screen information.

According to an embodiment of the disclosure, the one or more programs includes instructions causing the electronic device to change the execution screen of the application being displayed as the full screen to a pop-up screen, based on that the at least one configured condition is satisfied.

According to an embodiment of the disclosure, the one or more programs includes instructions causing the electronic device to transmit only the information on the execution screen of the application displayed on the pop-up screen to the external electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
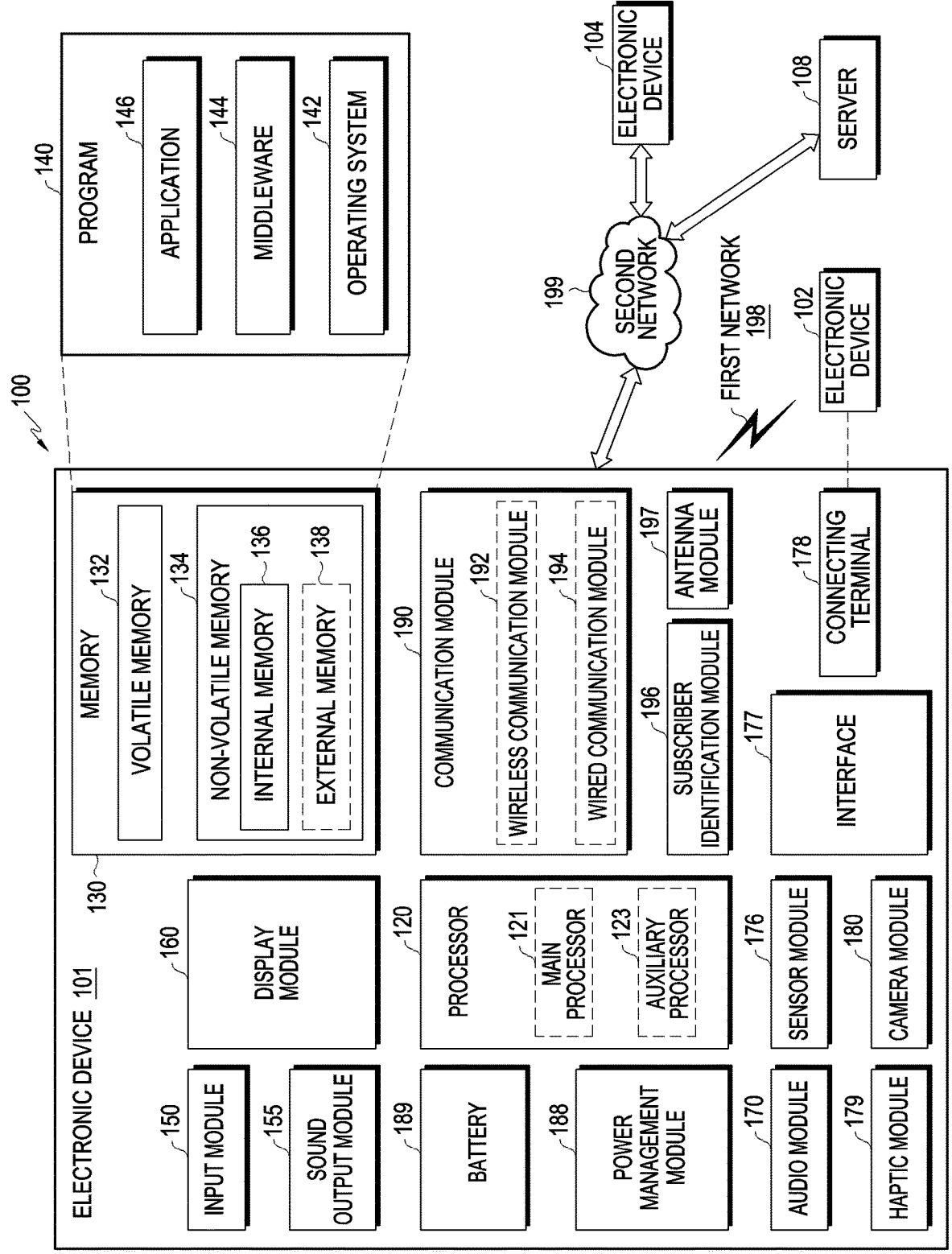
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
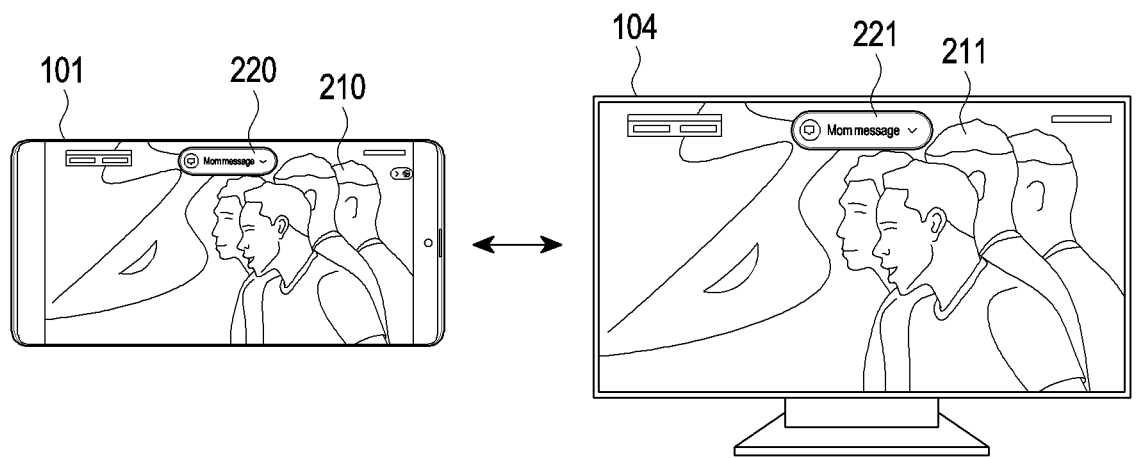
FIG. 2 is a diagram illustrating a mirroring operation of an electronic device according to an embodiment of the disclosure.

FIG. 2 is a diagram illustrating a mirroring operation of an electronic device according to an embodiment of the disclosure.

Referring to FIG. 2, an electronic device 101 (e.g., the electronic device 101 in FIG. 1) may share (e.g., mirror) a screen with an external electronic device 104 (e.g., the electronic device 104 in FIG. 1).

According to an embodiment of the disclosure, the electronic device 101 may transmit screen information on a screen 210 displayed on a display (e.g., the display module 160 in FIG. 1) to the external electronic device 104, and the external electronic device 104 may display a screen 211 corresponding to the screen 210 displayed on the display, based on the screen information received from the electronic device 101.

According to an embodiment of the disclosure, when a notification 220 notifying that an event has occurred is included in the screen 210 displayed on the display, the electronic device 101 may transmit screen information on the screen 210 including the notification 220 to the external electronic device 104, and the external electronic device 104 may display the screen 211 including a notification 221 to correspond to the screen 210 displayed on the display, based on the screen information received from the electronic device 101.

According to an embodiment of the disclosure, the electronic device 101 may be a mobile terminal, and the external electronic device 104 may be a TV and/or monitor.

The electronic device 101 and the external electronic device 104 sharing the entirety of a screen displayed on the display have been illustrated in FIG. 2 and described with reference to same. However, according to an embodiment of the disclosure, only a part of the screen of the electronic device 101 may be shared with the external electronic device 104.

According to an embodiment of the disclosure, in a state where the electronic device 101 and the external electronic device 104 share the entirety of a screen displayed on the display, if a configured condition is satisfied, a screen sharing range (or mirroring range) may be changed such that only a part of the screen of the electronic device 101 is shared with the external electronic device 104.

According to an embodiment of the disclosure, an embodiment in which a mirroring range is changed will be described below with reference to FIGS. 3 to 16.

Figure 3:
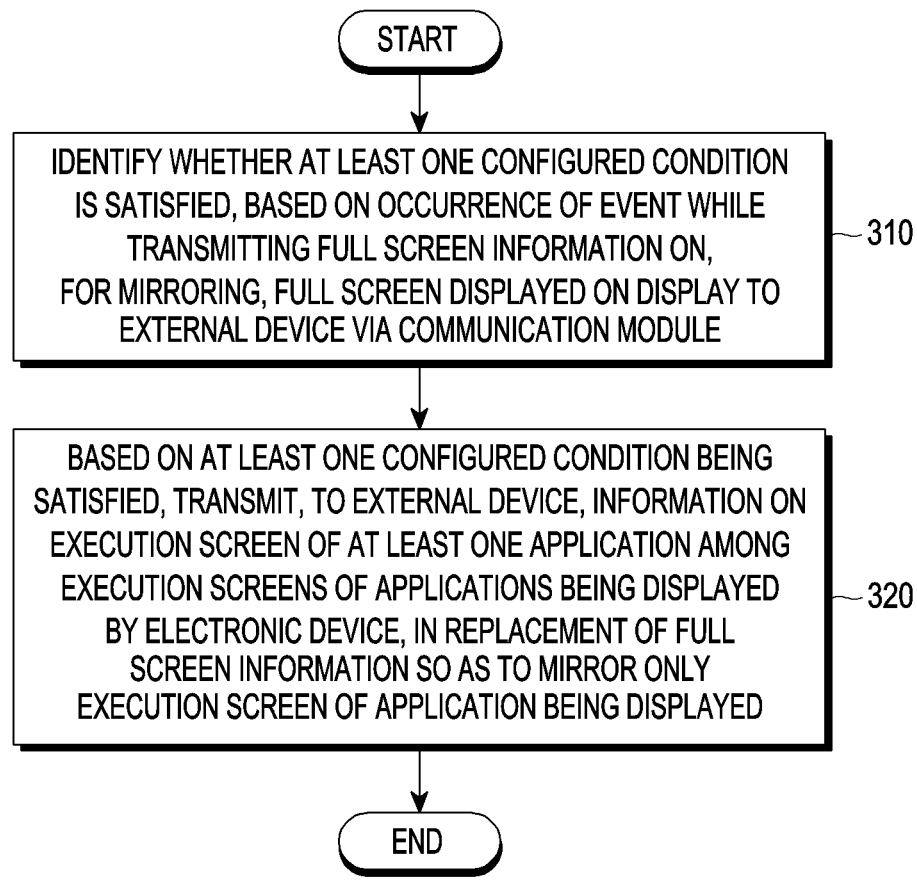
FIG. 3 is a flowchart illustrating a mirroring range change operation of an electronic device according to an embodiment of the disclosure.

FIG. 3 is a flowchart illustrating a mirroring range change operation of an electronic device according to an embodiment of the disclosure.

Referring to FIG. 3, in operation 310, an electronic device (e.g., the electronic device 101 in FIG. 1 or the processor 120 in FIG. 1) may identify whether at least one configured condition is satisfied, based on occurrence of an event in a state where the electronic device transmits full screen information (e.g., the first mirroring information) on, for mirroring, a full screen displayed on a display (e.g., the display module 160 in FIG. 1) to an external electronic device (e.g., the electronic device 104 in FIG. 1) via a communication module (e.g., the communication module 190 in FIG. 1).

According to an embodiment of the disclosure, the event may be reception of a new message, reception of a new mail, reception of a call, an alarm, and/or reception of a user input.

According to an embodiment of the disclosure, the at least one configured condition may be designed for changing a mirroring range. According to an embodiment of the disclosure, when an event occurs, the electronic device may identify that a condition for changing a mirroring range is satisfied. According to an embodiment of the disclosure, when an event occurs, the electronic device may identify whether a condition for changing a mirroring range, which is different from the event occurrence, is satisfied.

According to an embodiment of the disclosure, when an event is related to a personal content, the electronic device may identify that at least one configured condition is satisfied. For example, the electronic device may identify that at least one configured condition is satisfied, based on that information on a sender of a message or a mail related to an event matches information on a contact stored in a memory (e.g., the memory 130 in FIG. 1). According to an embodiment of the disclosure, the electronic device may identify that at least one configured condition is satisfied, based on that information on a sender of a message or a mail related to an event matches information on a contact designated by a user among contacts stored in the memory.

According to an embodiment of the disclosure, when a word related to a personal content and/or a word designated by a user is included in information (e.g., message contents, mail contents, or alarm name) related to an event, and/or an attached document is included in the information related to the event, the electronic device may identify that at least one configured condition is satisfied. According to an embodiment of the disclosure, when there is a possibility that an event is an important content for a user, the electronic device may identify that at least one configured condition is satisfied. For example, the electronic device may identify that at least one configured condition is satisfied, based on a history of contacting a sender of a message or a mail related to an event within a configured period before the occurrence of the event, and/or consecutive reception of a configured number of messages or mails or more from the same sender.

According to an embodiment of the disclosure, the electronic device may identify that at least one configured condition is satisfied, when the number of people included in a screen sharing environment is a configured value or greater and/or another person with a low intimacy level is included therein. For example, the electronic device may receive information on people in front of the external device, which is obtained via a camera of the external device, from the external device via the communication module, based on occurrence of an event. According to an embodiment of the disclosure, the information on the people may include the number of people in front of the external device and/or identification (ID) information on each person. According to an embodiment of the disclosure, the identification information on a person may include information (e.g., name and ID) enabling identification of who the person is, and/or information on a device of the person, which is paired with the external device.

According to an embodiment of the disclosure, the electronic device may identify the intimacy level with a user of the electronic device, based on the identification information on each person. For example, the electronic device may identify the intimacy level of each person, based on whether the user is cohabiting with the identified each person, the number of times of transmission or reception of a call, a message, and/or a mail with the identified each person, whether a call, a message, and/or a mail has been transmitted or received within a configured recent period, whether a contact is stored, whether a contact is configured in Favorites, whether the person is tagged in a stored photo, the number of times the identified each person is included in stored photos, and/or an intimacy level manually designated by the user for each person.

According to an embodiment of the disclosure, the electronic device may identify that at least one configured condition is satisfied, based on that the number of one or more people is a configured value or greater and/or a person with a low intimacy level is included therein, based on information on the one or more people.

According to an embodiment of the disclosure, the electronic device may identify that at least one configured condition is satisfied, based on a user input related to an event being out of an execution screen of an application. For example, when a user input (e.g., selection of a home key) for displaying a home screen or a user input (e.g., selection of a back key) for executing a backward navigation function is received while an execution screen of an application is displayed on the display, the electronic device may identify that at least one configured condition is satisfied.

According to an embodiment of the disclosure, the electronic device may identify that at least one configured condition is satisfied, based on consecutive occurrence of a pre-configured number of events. For example, in a state where notification is configured not to be displayed during a mirroring operation, when multiple messages or mails are consecutively received, the electronic device may determine that the importance level of an event is high and at least one configured condition is satisfied.

According to an embodiment of the disclosure, the electronic device may independently identify whether at least one configured condition is satisfied. According to an embodiment of the disclosure, independent identifying of whether at least one configured condition is satisfied will be described below with reference to FIG. 6.

According to an embodiment of the disclosure, in a case where multiple conditions are configured, the electronic device may independently identify whether the multiple configured conditions are satisfied, or identify same according to an order. According to an embodiment of the disclosure, in a case where multiple conditions are configured, independent identifying of whether the multiple configured conditions are satisfied will be described below with reference to FIG. 6, and order-dependent identifying of whether the multiple configured conditions are satisfied will be described below with reference to FIG. 7.

According to an embodiment of the disclosure, when a command for changing a mirroring range is received from a second external device while mirroring is performed with a first external device, the electronic device may identify that at least one condition is satisfied.

According to an embodiment of the disclosure, when an event occurs while mirroring is performed with a first external device, the electronic device may identify that at least one condition is satisfied, based on reception of, after the occurrence of the event from a second external device connected via the communication module, a command for mirroring, to the first external device, only an execution screen of an application being displayed on the display.

According to an embodiment of the disclosure, an embodiment of using the second external device to change a mirroring range with the first external device will be described with reference to FIGS. 14, 15, and 16.

According to an embodiment of the disclosure, in operation 320, based on the at least one configured condition being satisfied, the electronic device may transmit, to the external device, information on an execution screen of at least one application among execution screens of applications being displayed on the display, in replacement of the full screen information so as to mirror only the execution screen of the at least one application among the execution screens of the applications being displayed.

According to an embodiment of the disclosure, the electronic device may change (e.g., perform an app cast function) a mirroring range with the external device from a full screen to an execution screen of a particular application, based on the at least one configured condition being satisfied.

According to an embodiment of the disclosure, the electronic device may change an execution screen of an application being displayed in full screen to a pop-up screen (or split screen), based on the at least one configured condition being satisfied. For example, the electronic device may, based on the at least one configured condition being satisfied, change, to a pop-up screen or split screen, an execution screen of a video reproduction application, a browser application, a photo application, and/or a document application being displayed on the display in full screen and being mirrored to the external device in full screen.

According to an embodiment of the disclosure, the electronic device may transmit only information (e.g., the second mirroring screen) on an execution screen of an application displayed on a pop-up screen to the external electronic device.

According to an embodiment of the disclosure, an operation of the electronic device corresponding to a mirroring range change will be described below with reference to FIG. 4.

According to an embodiment of the disclosure, in a state where notification is configured to be displayed during a mirroring operation, the electronic device may transmit a screen including a notification to the external device, based on occurrence of an event.

According to an embodiment of the disclosure, the electronic device may transmit a screen including a notification and then transmit information on an execution screen of an application being displayed on the display to the external device so as to mirror only the execution screen of the application.

According to an embodiment of the disclosure, an embodiment of displaying a notification for an event before mirroring change in a case where a configured condition for changing a mirroring range is satisfied will be described below with reference to FIGS. 9, 10, and 13.

According to an embodiment of the disclosure, the electronic device may display a user interface that recommends to mirror only an execution screen of an application being displayed on the display, based on the at least one configured condition being satisfied.

According to an embodiment of the disclosure, based on reception of, through a user interface, a user input for mirroring only an execution screen of an application being displayed on the display, the electronic device may transmit information on the execution screen of the application to the external device in replacement of the full screen information.

According to an embodiment of the disclosure, an embodiment of receiving a user input for changing a mirroring range via a user interface will be described below with reference to FIGS. 11, 12, and 13.

According to an embodiment of the disclosure, in a case where a configured condition is not satisfied, the electronic device may perform a different operation, based on whether notification is configured to be allowed during mirroring.

According to an embodiment of the disclosure, an operation of the electronic device corresponding to whether a configured condition is satisfied and whether notification is configured to be allowed during mirroring will be described below with reference to FIGS. 5 and 8.

Figure 4:
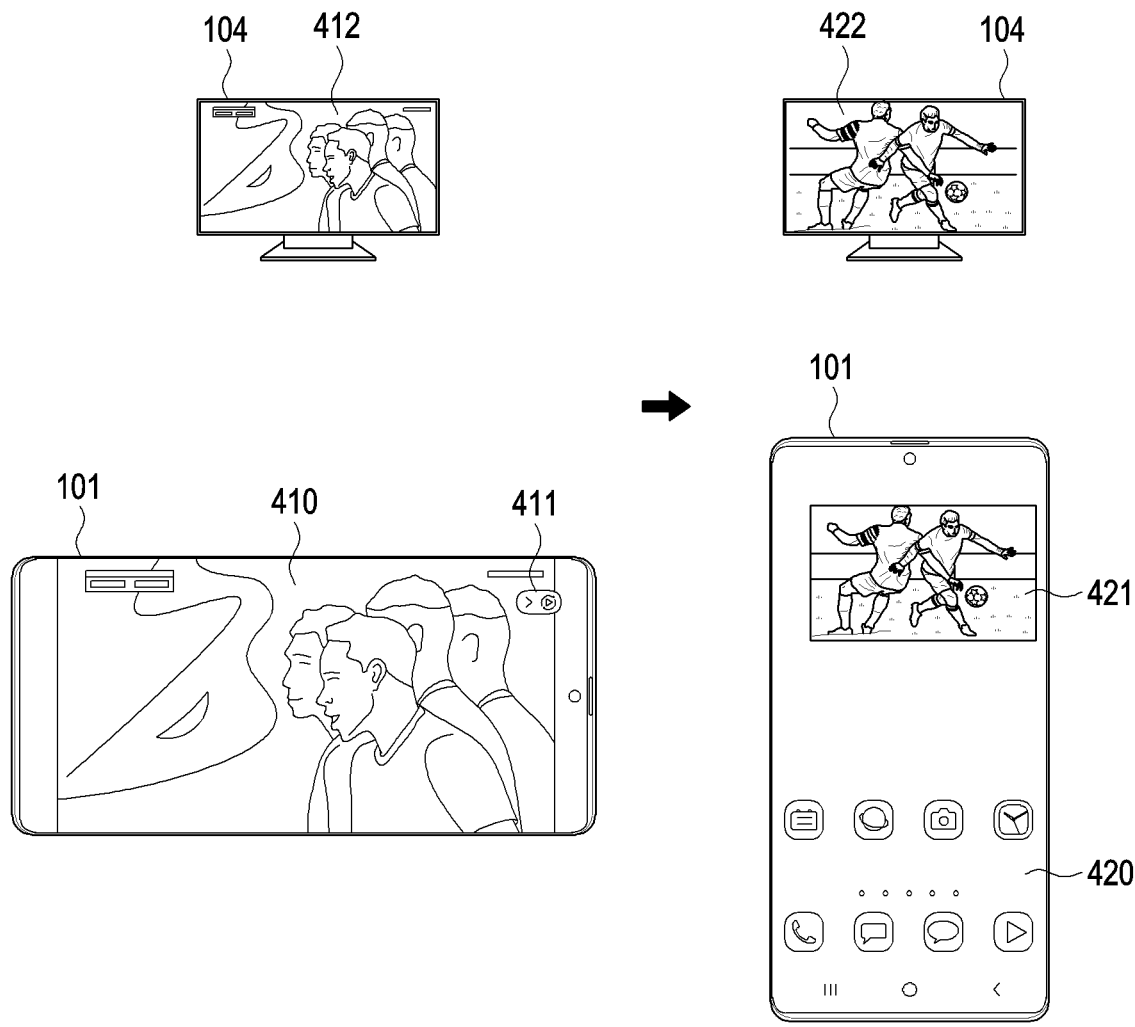
FIG. 4 is a diagram illustrating a mirroring range change operation of an electronic device according to an embodiment of the disclosure.

FIG. 4 is a diagram illustrating a mirroring range change operation of an electronic device according to an embodiment of the disclosure.

Referring to FIG. 4, an electronic device 101 (e.g., the electronic device 101 in FIG. 1 or the processor 120 in FIG. 1) may perform screen sharing (e.g., mirroring) with an external electronic device 104 (e.g., the electronic device 104 in FIG. 1). According to an embodiment of the disclosure, the electronic device 101 may transmit, to the external electronic device 104, screen information on a screen 410 displayed on a display (e.g., the display module 160 in FIG. 1). According to an embodiment of the disclosure, the electronic device 101 may transmit, to the external electronic device 104, screen information on the screen 410 displayed on the entirety of the display.

According to an embodiment of the disclosure, the external electronic device 104 may display a screen 412 corresponding to the screen 410 displayed on the electronic device 101, based on the received screen information.

According to an embodiment of the disclosure, the external electronic device 104 may display the screen 412 corresponding to the screen 410 displayed on the electronic device 101, on the entire display.

According to an embodiment of the disclosure, when an event occurs and at least one configured condition is satisfied, the electronic device 101 may change the application execution screen displayed on the entire area of the display to be displayed on a part area (421) of the display. For example, when an event occurs and at least one configured condition is satisfied, the electronic device 101 may change an execution screen of an application displayed on the entire display to a pop-up screen 421. According to an embodiment of the disclosure, the electronic device 101 may display a home screen or an execution screen of a different application executed by a user in a region 420 remaining after excluding the pop-up screen 421 from the display.

According to an embodiment of the disclosure, the electronic device 101 may display a user interface 411 for changing a mirroring range in a partial region of the display. According to an embodiment of the disclosure, when a user input is received through the user interface 411 for changing the mirroring range, the electronic device 101 may change the mirroring range from the entire display to an execution screen of a particular application, and change the execution screen 410 of the application displayed on the entire display to the pop-up screen 421.

According to an embodiment of the disclosure, the electronic device 101 may transmit only screen information on the pop-up screen 421 to the external electronic device 104. According to an embodiment of the disclosure, the electronic device 101 may not transmit screen information on the region 420 other than the pop-up screen 421 to the external electronic device 104.

According to an embodiment of the disclosure, the external electronic device 104 may display a screen 422 corresponding to the pop-up screen 421 displayed on the display of the electronic device 101, based on the screen information received from the electronic device 101. According to an embodiment of the disclosure, the external electronic device 104 may display a user interface indicating that the mirroring range has been changed, in a partial region of the screen 422.

According to an embodiment of the disclosure, the configured condition may be determined based on at least one of the privacy level of the event, the importance level of the event, a screen sharing environment, or a user input.

According to an embodiment of the disclosure, the electronic device may independently identify whether at least one configured condition is satisfied, or identify same according to an order. According to an embodiment of the disclosure, independent identifying of whether at least one configured condition is satisfied will be described below with reference to FIG. 6. According to an embodiment of the disclosure, order-dependent identifying of whether at least one configured condition is satisfied will be described below with reference to FIG. 7.

Receiving an event in a mirroring state and changing a mirroring range when a configured condition is satisfied have been illustrated in FIG. 4 and described with reference to same. However, according to an embodiment of the disclosure, the electronic device may change the mirroring range according to a user's selection after the configured condition is satisfied (see FIGS. 11 and 12) or, after the configured condition is satisfied, mirror a screen including a notification for the event and then change the mirroring range (see FIGS. 9 and 10). According to an embodiment of the disclosure, when the configured condition is satisfied, the electronic device may mirror a screen including a notification for the event and then change the mirroring range according to a user's selection (FIG. 13).

Figure 5:
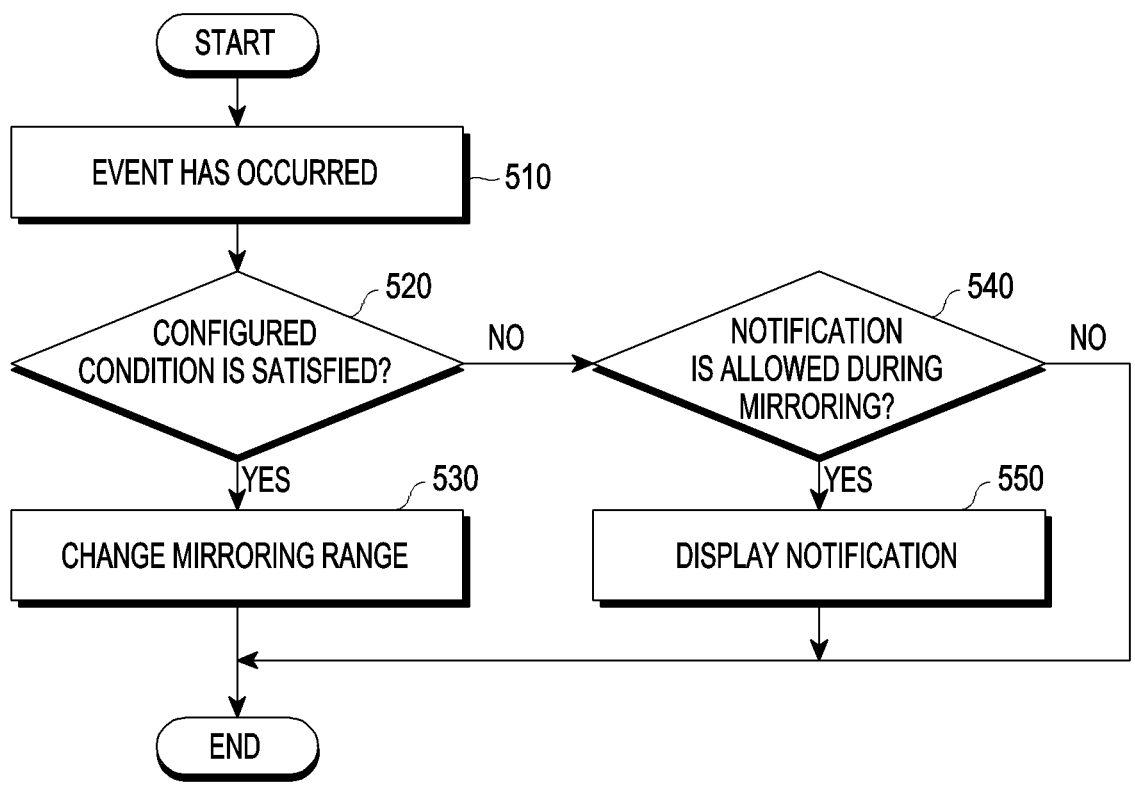
FIG. 5 is a diagram illustrating a mirroring range change operation according to notification permission or prohibition of an electronic device according to an embodiment of the disclosure.

FIG. 5 is a diagram illustrating a mirroring range change operation according to notification permission or prohibition of an electronic device according to an embodiment of the disclosure.

Referring to FIG. 5, in operation 510, an electronic device (e.g., the electronic device 101 in FIG. 1 or the processor 120 in FIG. 1) may identify occurrence of an event. According to an embodiment of the disclosure, the electronic device may identify occurrence of an event while mirroring a screen displayed on the entirety of a display (e.g., the display module 160 in FIG. 1) to an external electronic device (e.g., the electronic device 104 in FIG. 1).

According to an embodiment of the disclosure, the event may be reception of a new message, reception of a new mail, and/or reception of a user input.

According to an embodiment of the disclosure, in operation 520, the electronic device may identify whether a configured condition is satisfied.

According to an embodiment of the disclosure, the configured condition may be determined based on at least one of the privacy level of the event, the importance level of the event, a screen sharing environment, or a user input.

According to an embodiment of the disclosure, the electronic device may independently identify whether at least one configured condition is satisfied, or identify same according to an order. According to an embodiment of the disclosure, independent identifying of whether at least one configured condition is satisfied will be described below with reference to FIG. 6. According to an embodiment of the disclosure, order-dependent identifying of whether at least one configured condition is satisfied will be described below with reference to FIG. 7.

According to an embodiment of the disclosure, when the configured condition is satisfied (operation 520—Yes), the electronic device may change a mirroring range in operation 530. According to an embodiment of the disclosure, the electronic device may change the mirroring range with the external device from a full screen to an execution screen of a particular application, based on the configured condition being satisfied. For example, the electronic device may transmit, to the external device, information on an execution screen of an application being displayed on the display, in replacement of full screen information so as to mirror only the execution screen of the application being displayed.

According to an embodiment of the disclosure, the electronic device may, based on the configured condition being satisfied, change an execution screen of a particular application to be mirrored to a pop-up screen, and transmit only screen information on the pop-up screen to the external device without transmitting information on a screen other than the pop-up screen to the external device.

According to an embodiment of the disclosure, when the configured condition is not satisfied (operation 520—No), in operation 540, the electronic device may identify whether notification is allowed during mirroring. According to an embodiment of the disclosure, whether notification is allowed during mirroring may be configured by a user. According to an embodiment of the disclosure, when the configured condition is not satisfied at the time of event occurrence, the electronic device may operate according to permission or prohibition of mirroring notification which is a configuration value of a higher level.

According to an embodiment of the disclosure, when notification is allowed during mirroring (operation 540—Yes), the electronic device may display a notification for the event in operation 550. According to an embodiment of the disclosure, the electronic device may transmit screen information to the external device so as to mirror a screen including the notification for the event.

According to an embodiment of the disclosure, when notification is not allowed during mirroring (operation 540—No), the electronic device may not perform any operations related to the occurred event in a mirroring operation.

Identifying, after event occurrence, whether a configured condition is satisfied first and identifying whether notification is allowed during mirroring have been illustrated in FIG. 5 and described with reference to same. However, whether notification is allowed during mirroring may be first identified, and according to whether same is allowed, whether a different condition is satisfied may be identified. According to an embodiment of the disclosure, first identifying of whether notification is allowed during mirroring will be described below with reference to FIG. 8.

Figure 6:
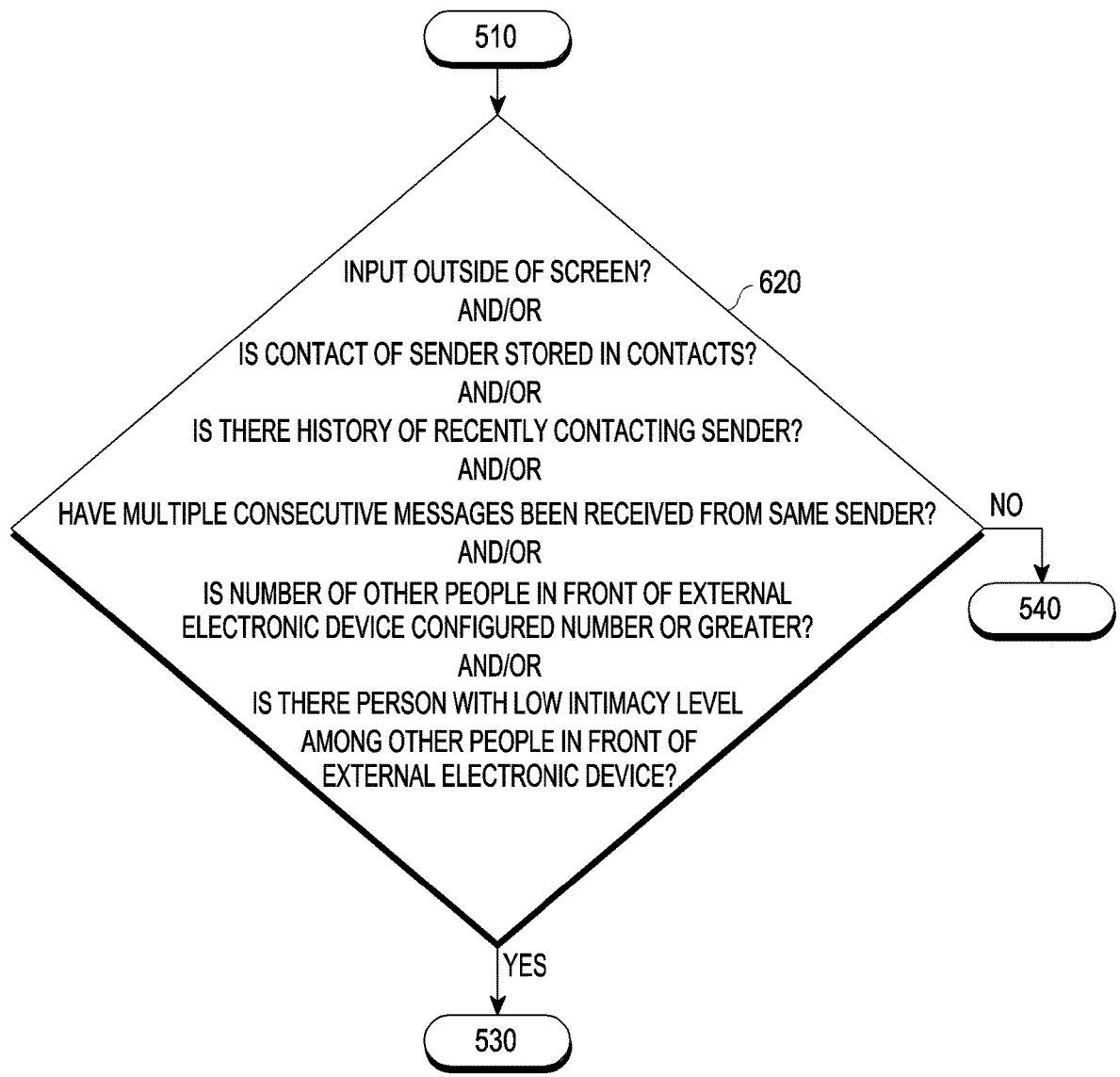
FIG. 6 is a flowchart illustrating a configured condition for mirroring range change of an electronic device according to an embodiment of the disclosure.

FIG. 6 is a flowchart illustrating a configured condition for mirroring range change of an electronic device according to an embodiment of the disclosure.

Referring to FIG. 6, when operation 510 in FIG. 5 in which an event occurs is performed in a state of mirroring with an external device (e.g., the electronic device 104 in FIG. 1), in operation 620, an electronic device (e.g., the electronic device 101 in FIG. 1 or the processor 120 in FIG. 1) may independently identify at least one configured condition.

According to an embodiment of the disclosure, the electronic device may identify whether a user input is an input outside of a screen (e.g., selection of a home key or a back key), whether the contact of a sender related to the event is stored in contacts, whether there is a history of recently contacting a sender related to the event, whether multiple consecutive messages have been received from the same sender, whether the number of people in front of the external device is a configured number or greater, and/or whether a person with a low intimacy level is included in people in front of the external device.

According to an embodiment of the disclosure, if one of the at least one configured condition is satisfied (e.g., operation 620—Yes), the electronic device may proceed to operation 530 in FIG. 5 and change a mirroring range from a full screen to an execution screen of a particular application.

According to an embodiment of the disclosure, if all the at least one configured condition is not satisfied (operation 620—No), the electronic device may proceed to operation 540 in FIG. 5, identify notification permission or prohibition during mirroring, which is a configuration of a higher level, and determine whether to display a notification for the event, based on the notification permission or prohibition during mirroring.

Figure 7:
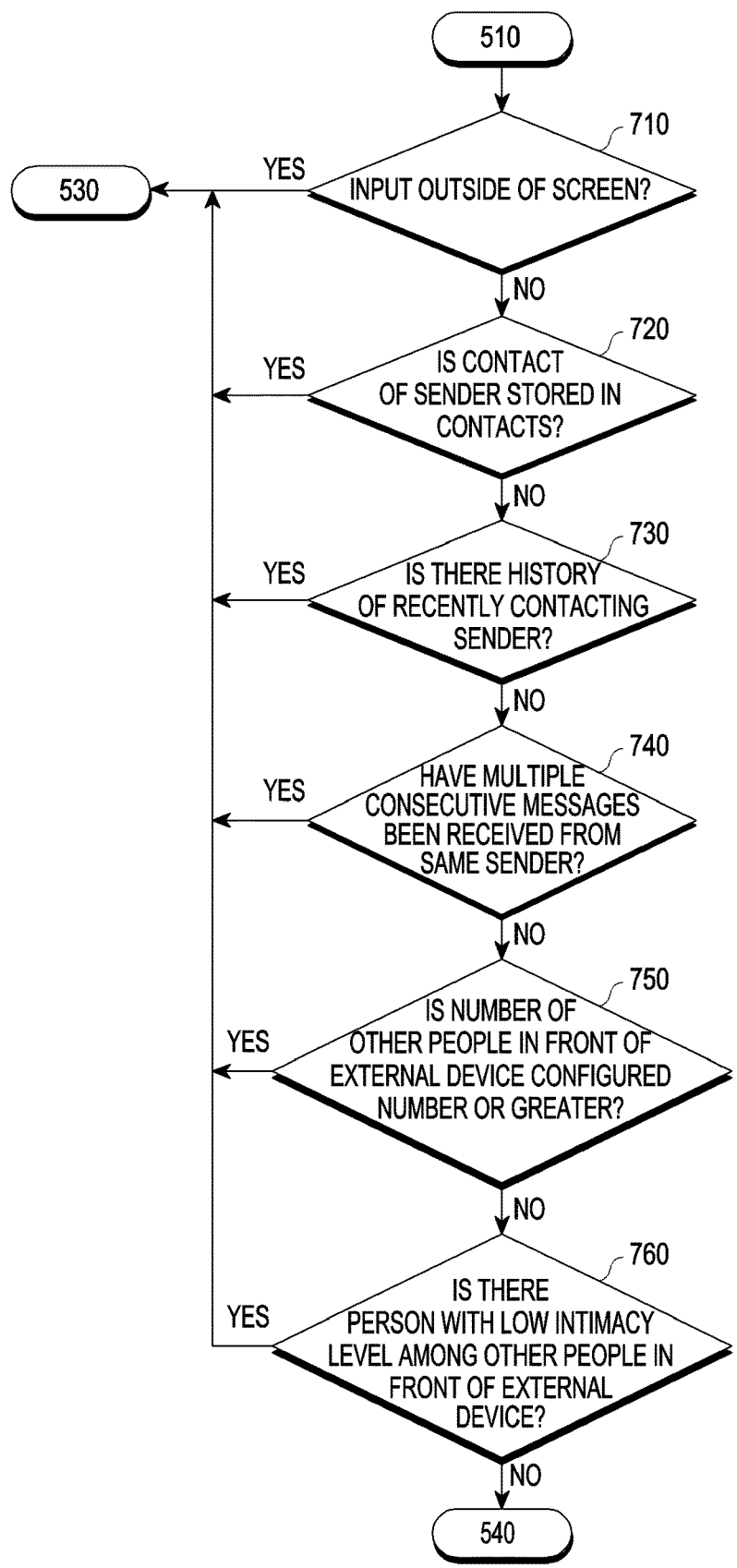
FIG. 7 is a flowchart illustrating a configured condition for mirroring range change of an electronic device according to an embodiment of the disclosure.

FIG. 7 is a flowchart illustrating a configured condition for mirroring range change of an electronic device according to an embodiment of the disclosure.

Referring to FIG. 7, when operation 510 in FIG. 5 in which an event occurs is performed in a state of mirroring with an external device (e.g., the electronic device 104 in FIG. 1), an electronic device (e.g., the electronic device 101 in FIG. 1 or the processor 120 in FIG. 1) may identify at least one configured condition according to an order.

According to an embodiment of the disclosure, in operation 710, the electronic device may identify whether a user input is an input outside of a screen (e.g., selection of a home key or a back key). According to an embodiment of the disclosure, when the user input is an input outside of the screen (e.g., operation 710—Yes), the electronic device may proceed to operation 530 in FIG. 5 and change a mirroring range from a full screen to an execution screen of a particular application.

According to an embodiment of the disclosure, when the user input is not an input outside of the screen (e.g., operation 710—No), in operation 720, the electronic device may identify whether the contact of a sender related to the event is stored in contacts. According to an embodiment of the disclosure, when the contact of the sender is stored in contacts (e.g., operation 720—Yes), the electronic device may proceed to operation 530 in FIG. 5 and change the mirroring range from a full screen to an execution screen of a particular application.

According to an embodiment of the disclosure, when the contact of the sender is not stored in the contacts (e.g., operation 720—No), in operation 730, the electronic device may identify whether there is a history of recently contacting a sender related to the event. According to an embodiment of the disclosure, when there is a history of contacting the sender within a configured recent period (e.g., operation 730—Yes), the electronic device may proceed to operation 530 in FIG. 5 and change the mirroring range from a full screen to an execution screen of a particular application.

According to an embodiment of the disclosure, when there is no history of contacting the sender for the configured recent period (e.g., operation 730—No), in operation 740, the electronic device may identify whether multiple consecutive messages have been received from the same sender. According to an embodiment of the disclosure, when a configured number of consecutive messages have been received from the same sender (e.g., operation 740—Yes), the electronic device may proceed to operation 530 in FIG. 5 and change the mirroring range from a full screen to an execution screen of a particular application.

According to an embodiment of the disclosure, when messages the number of which is one or smaller than a configured number have been consecutively received from the same sender (e.g., operation 740—Yes), in operation 750, the electronic device may identify whether the number of people in front of the external device is equal to or greater than a configured number. According to an embodiment of the disclosure, when the number of people in front of the external device is equal to or greater than the configured number (e.g., operation 750—Yes), the electronic device may proceed to operation 530 in FIG. 5 and change the mirroring range from a full screen to an execution screen of a particular application.

According to an embodiment of the disclosure, when the number of people in front of the external device is smaller than the configured number (e.g., operation 750—Yes), in operation 760, the electronic device may identify whether a person with a low intimacy level is included in people in front of the external device. According to an embodiment of the disclosure, when a person with a low intimacy level is included in the people in front of the external device (e.g., operation 760—Yes), the electronic device may proceed to operation 530 in FIG. 5 and change the mirroring range from a full screen to an execution screen of a particular application.

According to an embodiment of the disclosure, if all the people in front of the external device have high intimacy levels (e.g., operation 760—Yes), the electronic device may proceed to operation 540 in FIG. 5, identify notification permission or prohibition during mirroring, which is a configuration of a higher level, and determine whether to display a notification for the event, based on the notification permission or prohibition during mirroring.

The number and order of at least one configured conditions illustrated in FIG. 7 merely correspond to an example, and are not limited thereto.

Figure 8:
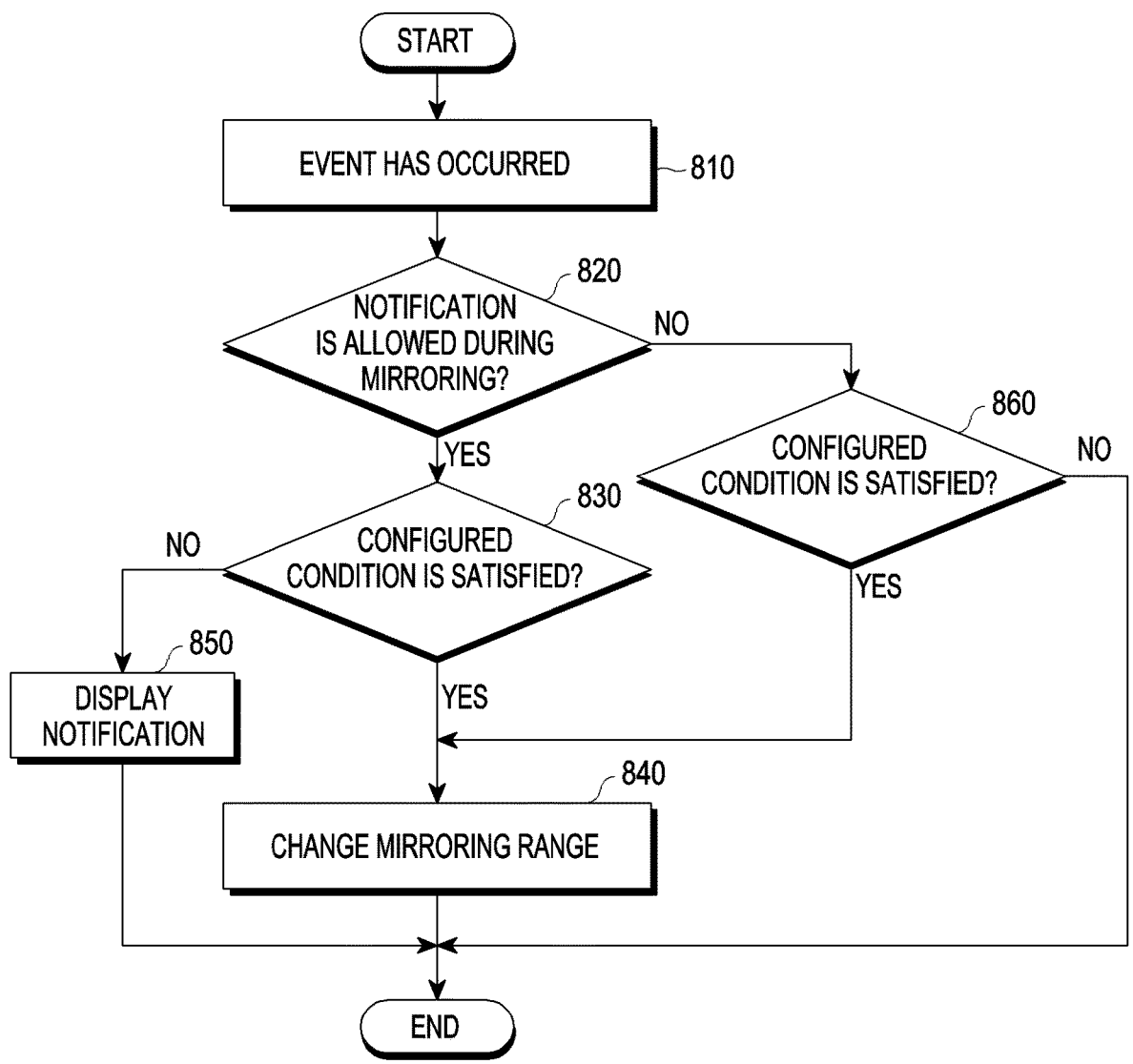
FIG. 8 is a diagram illustrating a mirroring range change operation according to notification permission or prohibition of an electronic device according to an embodiment of the disclosure.

FIG. 8 is a diagram illustrating a mirroring range change operation according to notification permission or prohibition of an electronic device according to an embodiment of the disclosure.

Referring to FIG. 8, in operation 810, an electronic device (e.g., the electronic device 101 in FIG. 1 or the processor 120 in FIG. 1) may identify occurrence of an event. According to an embodiment of the disclosure, operation 810 is the same as operation 510 in FIG. 5, and thus an overlapping description will be omitted.

According to an embodiment of the disclosure, in operation 820, the electronic device may identify whether notification is allowed during mirroring. According to an embodiment of the disclosure, whether notification is allowed during mirroring may be configured by a user. According to an embodiment of the disclosure, according to whether notification is allowed during mirroring, a condition required to be satisfied for mirroring range change may vary.

According to an embodiment of the disclosure, when notification is allowed during mirroring (operation 820—Yes), in operation 830, the electronic device may identify whether a configured condition of a state where notification is allowed during mirroring is satisfied.

According to an embodiment of the disclosure, the configured condition may be determined based on at least one of the privacy level of the event, the importance level of the event, a screen sharing environment, or a user input. For example, the electronic device may identify whether a user input is an input outside of a screen (e.g., selection of a home key or a back key), whether the contact of a sender related to the event is stored in contacts, whether there is a history of recently contacting a sender related to the event, whether the number of people in front of the external device is a configured number or greater, and/or whether a person with a low intimacy level is included in people in front of the external device.

According to an embodiment of the disclosure, when the configured condition of the state where notification is allowed during mirroring is satisfied (operation 830—Yes), in operation 840, the electronic device may change a mirroring range. According to an embodiment of the disclosure, the electronic device may change the mirroring range with the external device from a full screen to an execution screen of a particular application, based on that the configured condition of the state where notification is allowed during mirroring is satisfied. For example, the electronic device may transmit, to the external device, information on an execution screen of an application being displayed on the display, in replacement of full screen information so as to mirror only the execution screen of the application being displayed.

According to an embodiment of the disclosure, when the configured condition of the state where notification is allowed during mirroring is not satisfied (operation 830—No), in operation 850, the electronic device may display a notification for the event. According to an embodiment of the disclosure, the electronic device may transmit screen information to the external device so as to mirror a screen including the notification for the event.

According to an embodiment of the disclosure, when notification is not allowed during mirroring (operation 820—Yes), in operation 860, the electronic device may identify whether a configured condition of a state where notification is not allowed during mirroring is satisfied.

According to an embodiment of the disclosure, the configured condition may be determined based on at least one of the importance level of the event and/or a user input. For example, the electronic device may identify whether a user input is an input outside of a screen (e.g., selection of a home key or a back key), and whether multiple consecutive messages have been received from the same sender stored in contacts.

According to an embodiment of the disclosure, when the configured condition of the state where notification is not allowed during mirroring is satisfied (operation 860—Yes), the electronic device may proceed to operation 840 and change the mirroring range.

According to an embodiment of the disclosure, when the configured condition of the state where notification is not allowed during mirroring is not satisfied (operation 860—No), the electronic device may not perform any operations related to the occurred event in a mirroring operation.

As described above, different conditions are identified to be satisfied or not satisfied according to whether notification is allowed during mirroring, so that a mirroring range change operation corresponding to a user's situation may be more effectively performed.

Figure 9:
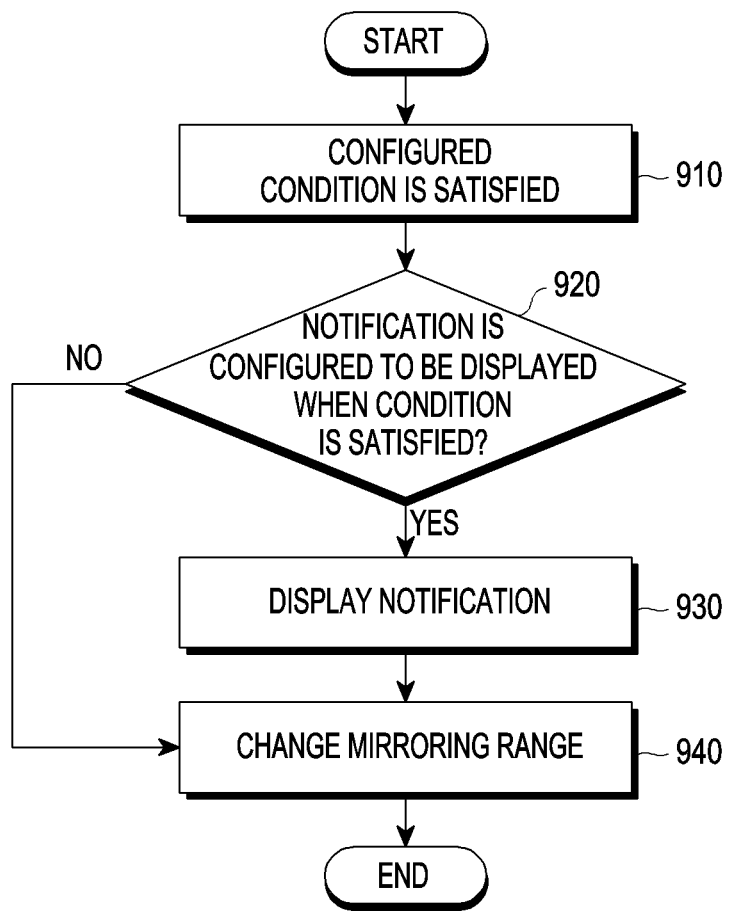
FIG. 9 is a flowchart illustrating an operation of a case where a configured condition for mirroring range change is satisfied in a state where notification is permitted during mirroring of an electronic device according to an embodiment of the disclosure.

FIG. 9 is a flowchart illustrating an operation of a case where a configured condition for mirroring range change is satisfied in a state where notification is permitted during mirroring of an electronic device according to an embodiment of the disclosure.

Figure 10:
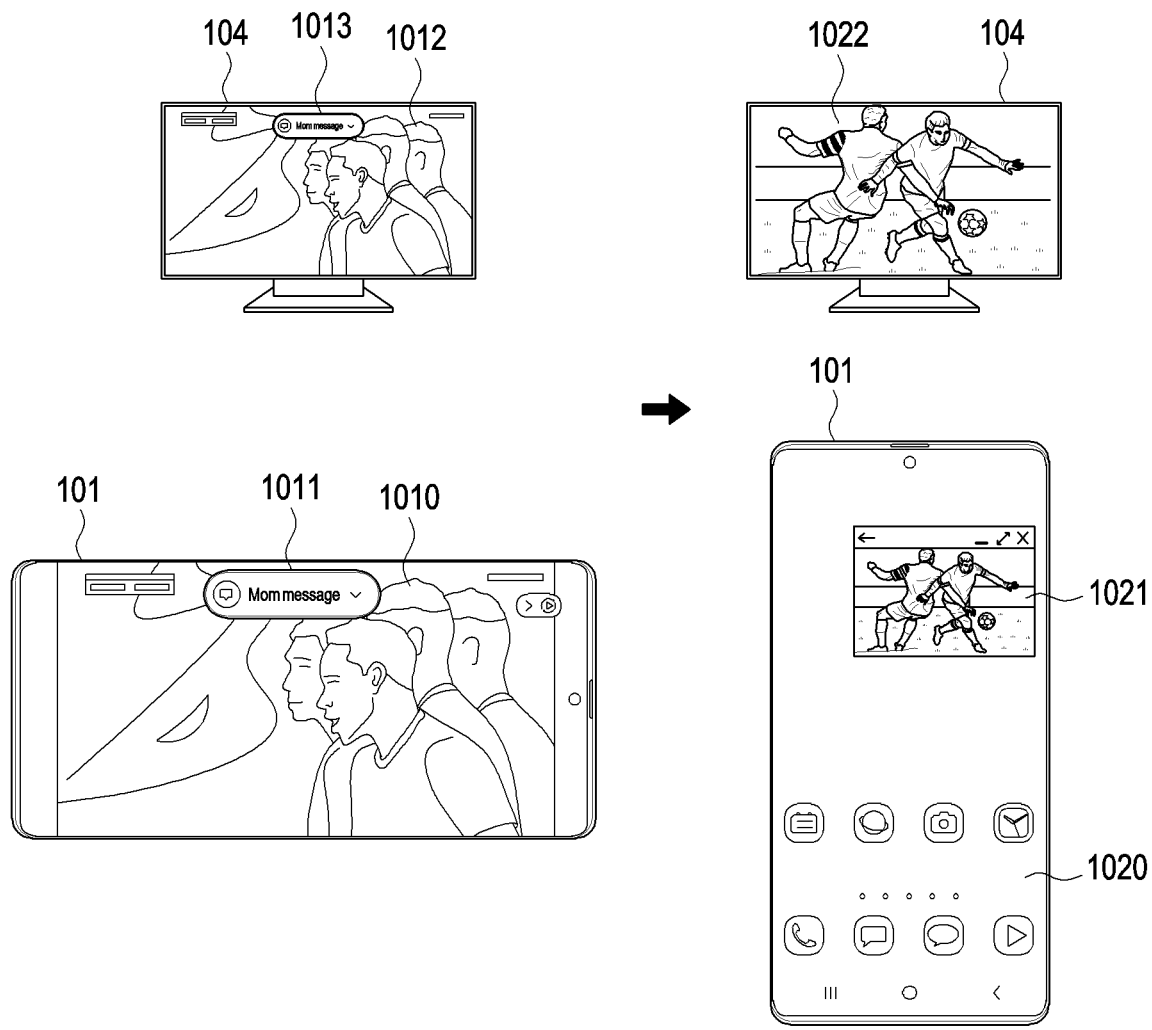
FIG. 10 is a diagram illustrating an operation of changing a mirroring range from a full screen to a pop-up screen after displaying a notification for an event by an electronic device according to an embodiment of the disclosure.

FIG. 10 is a diagram illustrating an operation of changing a mirroring range from a full screen to a pop-up screen after displaying a notification for an event by an electronic device according to an embodiment of the disclosure.

Referring to FIG. 9, in operation 910, an electronic device (e.g., the electronic device 101 in FIG. 1 or the processor 120 in FIG. 1) may identify that a configured condition is satisfied. According to an embodiment of the disclosure, operation 910 of FIG. 9 is, as illustrated in FIG. 10, in the same state as that of "operation 520—Yes" in FIG. 5, "operation 830—Yes" in FIG. 8, or "operation 860—Yes" in FIG. 8 in which, during mirroring between a screen of the electronic device 101 and a screen of the external electronic device 104, an event occurs and a configured condition is satisfied. Therefore, an overlapping description will be omitted.

According to an embodiment of the disclosure, in operation 920, the electronic device may identify whether notification is configured to be displayed when the condition is satisfied. According to an embodiment of the disclosure, the electronic device may configure to display notification when the configured condition is satisfied, independently to whether notification is allowed at the time of event occurrence. For example, even in a case where notification is allowed at the time of event occurrence, if notification is configured not to be displayed when the configured condition is satisfied, a notification for the event may not be displayed when the configured condition is satisfied. According to an embodiment of the disclosure, even in a case where notification is not allowed at the time of event occurrence, if notification is configured to be displayed when the configured condition is satisfied, a notification for the event may be displayed when the configured condition is satisfied.

According to an embodiment of the disclosure, whether to display notification when the configured condition is satisfied may be configured by a user input.

According to an embodiment of the disclosure, when notification is configured to be displayed when the condition is satisfied (operation 920—Yes), in operation 930, the electronic device may display a notification 1011 for the event as illustrated in FIG. 10. According to an embodiment of the disclosure, the electronic device may transmit a screen 1010 including the notification 1011 to the external electronic device 104 (e.g., the electronic device 104 in FIG. 1) to mirror the screen.

According to an embodiment of the disclosure, the external electronic device 104 may display a screen 1012 including a notification 1013 to correspond to the screen 1010 including the notification 1011 of the electronic device 101.

According to an embodiment of the disclosure, in operation 940, the electronic device may change a mirroring range. According to an embodiment of the disclosure, as illustrated in FIG. 10, the electronic device 101 may change an execution screen of an application displayed on the entire display to a pop-up screen 1021. According to an embodiment of the disclosure, the electronic device 101 may display a home screen or an execution screen of a different application executed by a user in a region 1020 remaining after excluding the pop-up screen 1021 from the display.

According to an embodiment of the disclosure, the electronic device 101 may transmit only screen information on the pop-up screen 1021 to the external electronic device 104. According to an embodiment of the disclosure, the electronic device 101 may not transmit screen information on the region 1020 other than the pop-up screen 1021 to the external electronic device 104.

According to an embodiment of the disclosure, the external electronic device 104 may display a screen 1022 corresponding to the pop-up screen 1021 displayed on the display of the electronic device 101, based on the screen information received from the electronic device 101.

According to an embodiment of the disclosure, when notification is configured not to be displayed when the condition is satisfied (operation 920—No), the electronic device may proceed to operation 940 and change the mirroring range without notification display.

Figure 11:
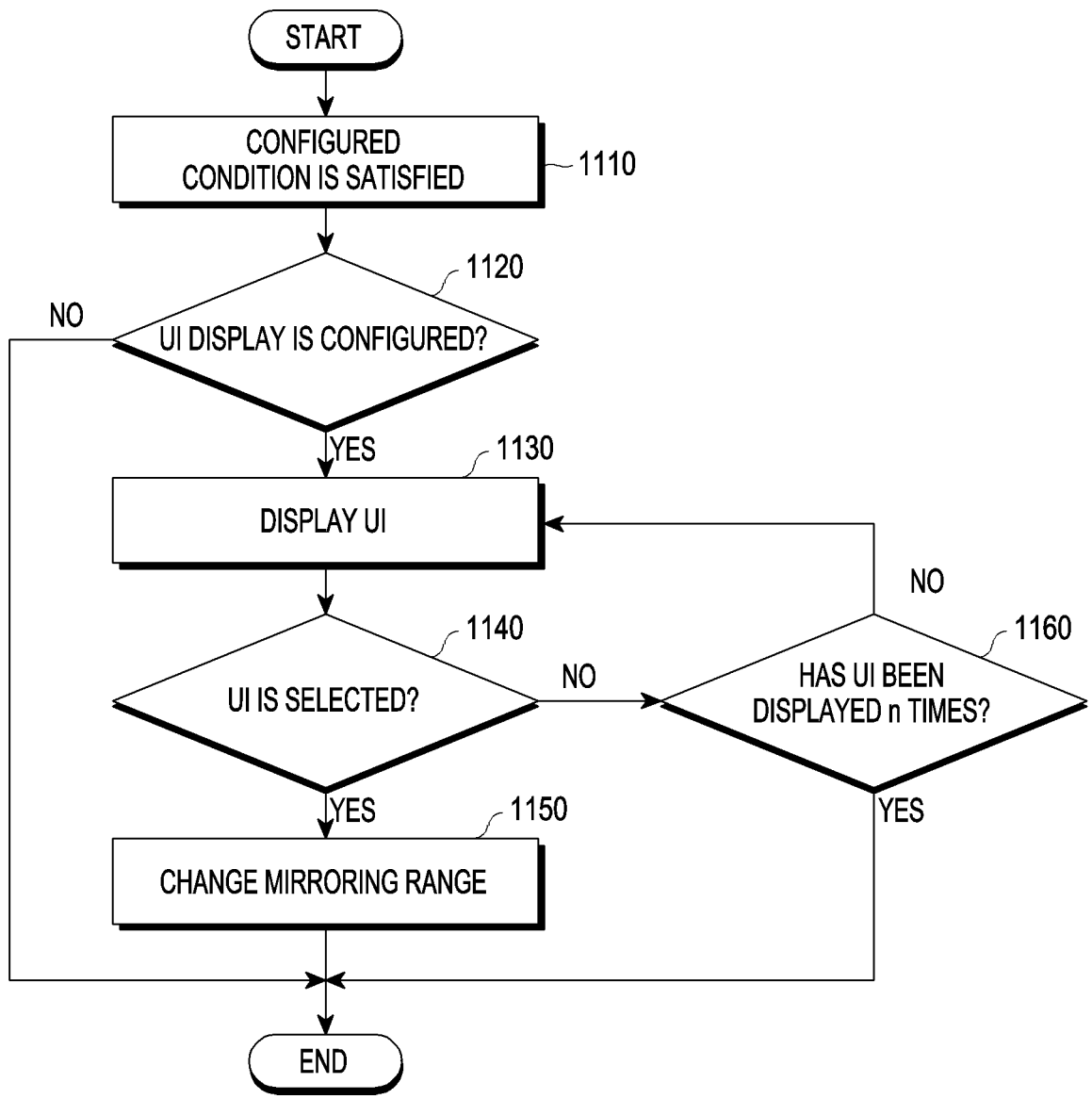
FIG. 11 is a flowchart illustrating an operation of, receiving confirmation from a user, whether to change a mirroring range via a user interface when a configured condition is satisfied, of an electronic device according to an embodiment of the disclosure.

FIG. 11 is a flowchart illustrating an operation of, receiving confirmation from a user, whether to change a mirroring range via a user interface when a configured condition is satisfied, of an electronic device according to an embodiment of the disclosure.

Figure 12:
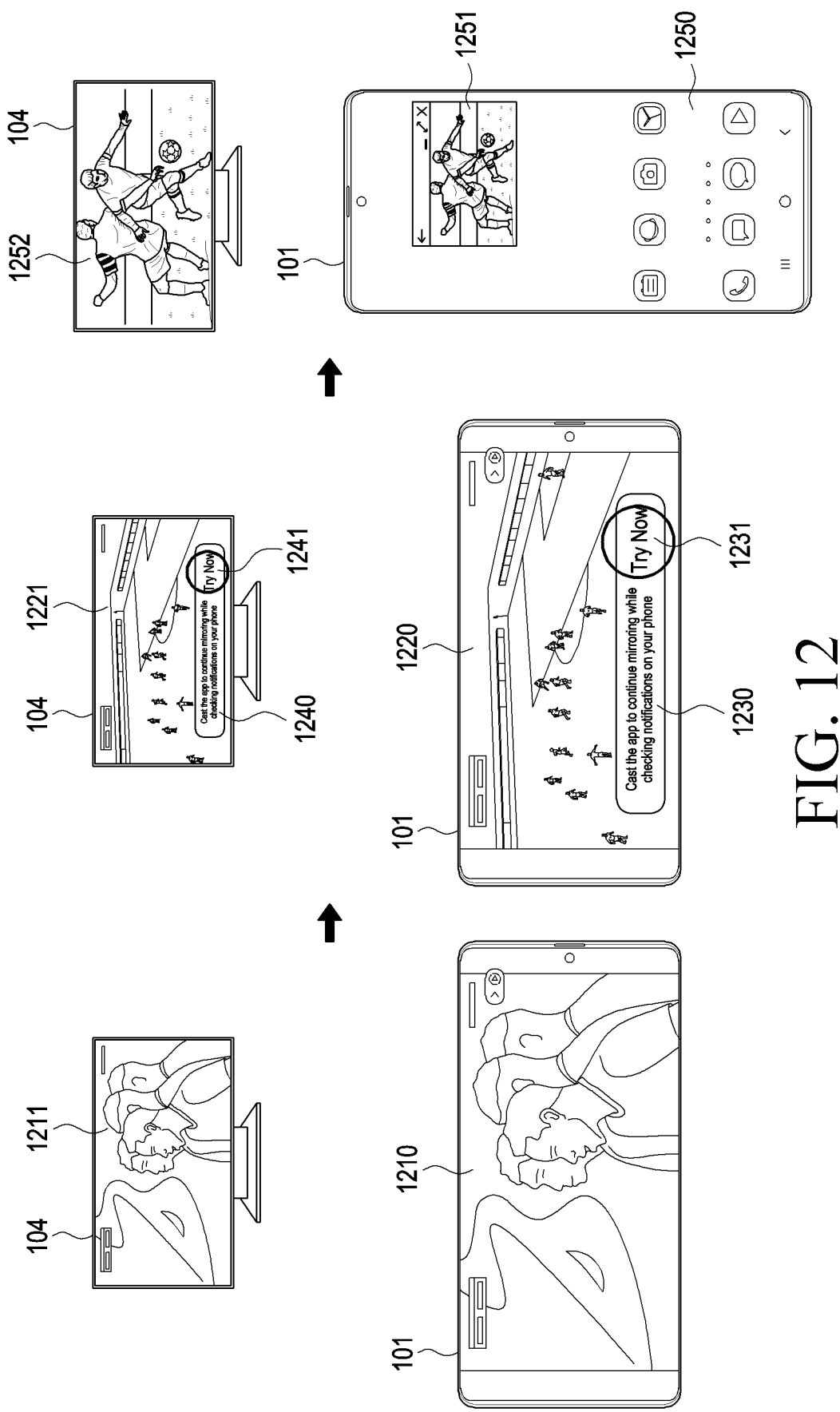
FIG. 12 is a diagram illustrating an operation of, receiving confirmation from a user, whether to change a mirroring range via a user interface when a configured condition is satisfied, of an electronic device according to an embodiment of the disclosure.

FIG. 12 is a diagram illustrating an operation of, receiving confirmation from a user, whether to change a mirroring range via a user interface when a configured condition is satisfied, of an electronic device according to an embodiment of the disclosure.

Referring to FIG. 11, in operation 1110, an electronic device (e.g., the electronic device 101 in FIG. 1 or the processor 120 in FIG. 1) may identify that a configured condition is satisfied. According to an embodiment of the disclosure, operation 1110 of FIG. 11 is, as illustrated in FIG. 11, in the same state as that of "operation 520—Yes" in FIG. 5, "operation 830—Yes" in FIG. 8, or "operation 860—Yes" in FIG. 8 in which, during mirroring between a screen 1210 of the electronic device 101 and a screen 1211 of the external electronic device 104, an event occurs and a configured condition is satisfied. Therefore, an overlapping description will be omitted.

According to an embodiment of the disclosure, in operation 1120, the electronic device may identify whether a user interface (UI) for mirroring range change is configured to be displayed.

According to an embodiment of the disclosure, when UI display is configured (operation 1120—Yes), in operation 1130, the electronic device 101 may display a UI 1230 for changing a mirroring range on a screen 1220 which is mirrored to the external electronic device 104, as illustrated in FIG. 12. According to an embodiment of the disclosure, the UI 1230 for changing the mirroring range may include a content (e.g., Cast the app continue mirroring while checking notification on your phone) that recommends to mirror only an application being displayed while a notification is checked on the electronic device 101 (phone), and a UI 1231 for executing the change of the mirroring range.

According to an embodiment of the disclosure, the electronic device 101 may transmit, to the external electronic device 104, screen information on the screen 1220 including the UI 1230 for changing the mirroring range. According to an embodiment of the disclosure, the external electronic device 104 may display a screen 1221 including a UI 1240 for changing the mirroring range, based on the received screen information. According to an embodiment of the disclosure, the UI 1240 for changing the mirroring range may include a UI 1241 for executing the change of the mirroring range and the same content as that of the UI 1230 for changing the mirroring range displayed on the electronic device 101.

According to an embodiment of the disclosure, the electronic device 101 may transmit screen information not including information on the UI 1230 for changing the mirroring range to the external electronic device 104, and thus the external electronic device 104 may not display the UI 1240 for changing the mirroring range.

According to an embodiment of the disclosure, the electronic device 101 may not display the UI 1230 for changing the mirroring range on the display and transmit only information on the UI 1230 to the external electronic device 104, and thus only the external electronic device 104 may display the UI 1240 for changing the mirroring range.

According to an embodiment of the disclosure, in operation 1140, the electronic device may identify whether the UI is selected.

According to an embodiment of the disclosure, as illustrated in FIG. 12, when a user input of selecting the UI 1231 for executing the change of the mirroring range included in the UI 1230 for changing the mirroring range is received (operation 1140—Yes), in operation 1150, the electronic device 101 may change the mirroring range.

According to an embodiment of the disclosure, when a user input of selecting the UI 1241 for executing the change of the mirroring range included in the UI 1240 for changing the mirroring range displayed on the external electronic device 104 is received, the electronic device 101 may proceed to operation 1150 and change the mirroring range.

According to an embodiment of the disclosure, as illustrated in FIG. 12, the electronic device 101 may change an execution screen of an application displayed on the entire display to a pop-up screen 1251. According to an embodiment of the disclosure, the electronic device 101 may display a home screen or an execution screen of a different application executed by a user in a region 1250 remaining after excluding the pop-up screen 1251 from the display.

According to an embodiment of the disclosure, the electronic device 101 may transmit only screen information on the pop-up screen 1251 to the external electronic device 104. According to an embodiment of the disclosure, the electronic device 101 may not transmit screen information on the region 1250 other than the pop-up screen 1251 to the external electronic device 104.

According to an embodiment of the disclosure, the external electronic device 104 may display a screen 1252 corresponding to the pop-up screen 1251 displayed on the display of the electronic device 101, based on the screen information received from the electronic device 101.

According to an embodiment of the disclosure, when a user input of selecting the UI 1231 for executing the change of the mirroring range included in the UI 1230 for changing the mirroring range and/or the UI 1241 for executing the change of the mirroring range included in the UI 1240 for changing the mirroring range is not received (operation 1140—No), in operation 1160, the electronic device 101 may identify whether the UI 1230 and/or 1240 for changing the mirroring range has been displayed n times.

According to an embodiment of the disclosure, when the UI 1230 and/or 1240 for changing the mirroring range has not been displayed n times (operation 1160-No), the electronic device may proceed to operation 1130 and display the UI again.

According to an embodiment of the disclosure, when the UI 1230 and/or 1240 for changing the mirroring range has been displayed n times (operation 1160—Yes), the electronic device may terminate the operation without changing the mirroring range.

Figure 13:
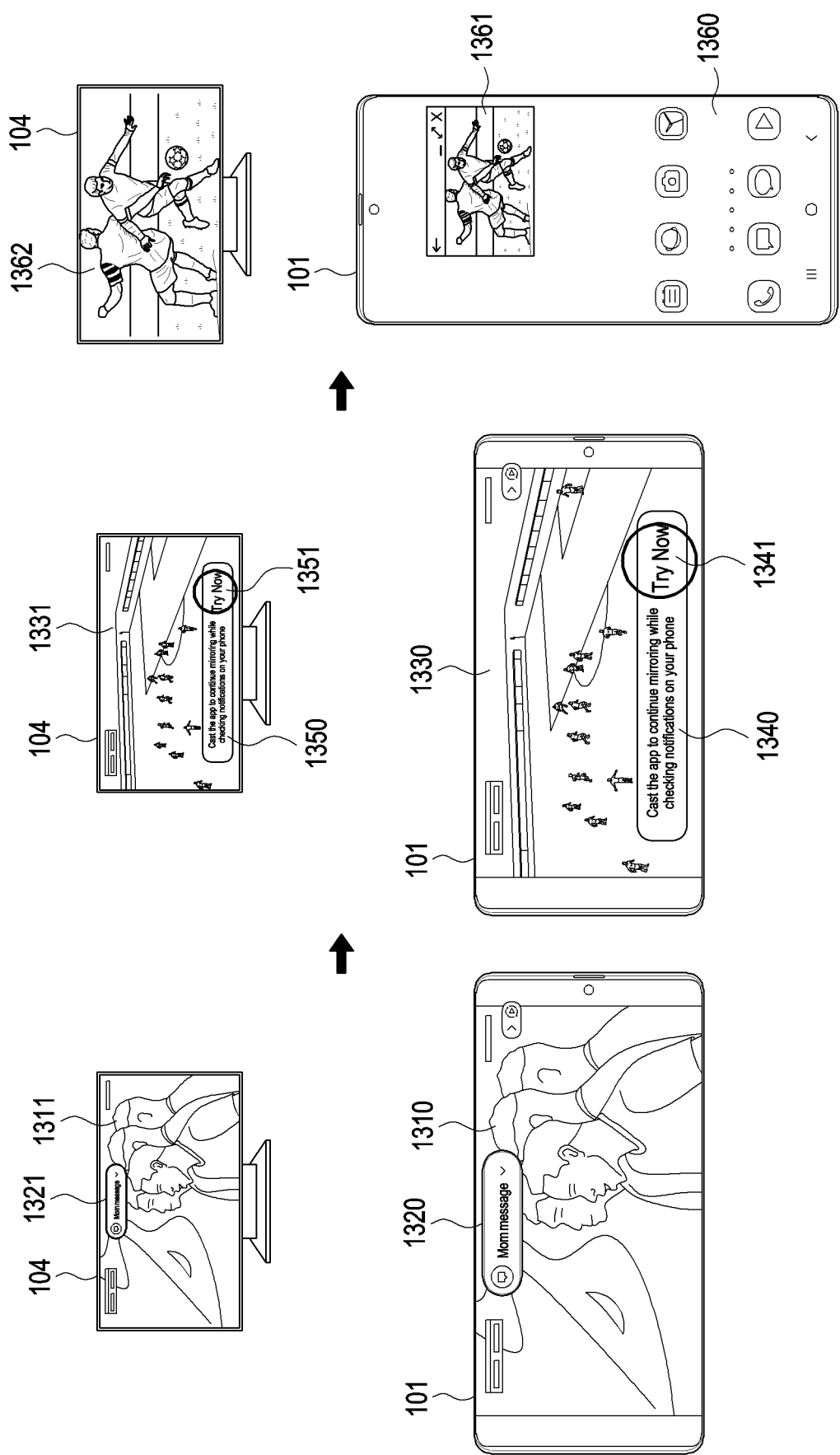
FIG. 13 is a diagram illustrating an operation of identifying, by a user, whether to change a mirroring range via a user interface when a configured condition is satisfied in a state where notification is configured to be displayed during mirroring of an electronic device according to an embodiment of the disclosure.

FIG. 13 is a diagram illustrating an operation of identifying, by a user, whether to change a mirroring range via a user interface when a configured condition is satisfied in a state where notification is configured to be displayed during mirroring of an electronic device according to an embodiment of the disclosure. For example, FIG. 13 illustrates an embodiment in which operation 1120 to operation 1140 in FIG. 11 are performed between operation 930 and operation 940 in FIG. 9.

Referring to FIG. 13, the electronic device 101 (e.g., the electronic device 101 in FIG. 1 or the processor 120 in FIG. 1) may be in the same state as that of "operation 520—Yes" in FIG. 5, "operation 830—Yes" in FIG. 8, or "operation 860—Yes" in FIG. 8 in which, during mirroring between a screen of the electronic device 101 and a screen of the external electronic device 104, an event occurs and a configured condition is satisfied.

According to an embodiment of the disclosure, when notification is configured to be displayed when the condition is satisfied, the electronic device may display a notification 1320 for the event. According to an embodiment of the disclosure, the electronic device may transmit a screen 1310 including the notification 1320 to the external electronic device 104 (e.g., the electronic device 104 in FIG. 1) to mirror the screen.

According to an embodiment of the disclosure, the external electronic device 104 may display a screen 1311 including a notification 1321 to correspond to the screen 1310 including the notification 1320 of the electronic device 101.

According to an embodiment of the disclosure, when a UI for changing a mirroring range is configured to be displayed when the condition is satisfied, the electronic device 101 may display a UI 1340 for changing the mirroring range on a screen 1330 which is mirrored to the external electronic device 104. According to an embodiment of the disclosure, the UI 1340 for changing the mirroring range may include a content (e.g., Cast the app continue mirroring while checking notification on your phone) that recommends to mirror only an application being displayed while a notification is checked on the electronic device 101 (phone), and a UI 1341 for executing the change of the mirroring range.

According to an embodiment of the disclosure, the electronic device 101 may transmit, to the external electronic device 104, screen information on the screen 1330 including the UI 1340 for changing the mirroring range. According to an embodiment of the disclosure, the external electronic device 104 may display a screen 1331 including a UI 1350 for changing the mirroring range, based on the received screen information. According to an embodiment of the disclosure, the UI 1350 for changing the mirroring range may include a UI 1341 for executing the change of the mirroring range and the same content as that of the UI 1340 for changing the mirroring range displayed on the electronic device 101.

According to an embodiment of the disclosure, the electronic device 101 may transmit screen information not including information on the UI 1340 for changing the mirroring range to the external electronic device 104, and thus the external electronic device 104 may not display the UI 1350 for changing the mirroring range.

According to an embodiment of the disclosure, the electronic device 101 may not display the UI 1340 for changing the mirroring range on the display and transmit only information on the UI 1340 to the external electronic device 104, and thus only the external electronic device 104 may display the UI 1350 for changing the mirroring range.

According to an embodiment of the disclosure, when a user input of selecting the UI 1341 for executing the change of the mirroring range included in the UI 1340 for changing the mirroring range is received, the electronic device 101 may change the mirroring range.

According to an embodiment of the disclosure, when a user input of selecting the UI 1351 for executing the change of the mirroring range included in the UI 1350 for changing the mirroring range displayed on the external electronic device 104 is received, the electronic device 101 may change the mirroring range.

According to an embodiment of the disclosure, the electronic device 101 may change an execution screen of an application displayed on the entire display to a pop-up screen 1361. According to an embodiment of the disclosure, the electronic device 101 may display a home screen or an execution screen of a different application executed by a user in a region 1360 remaining after excluding the pop-up screen 1361 from the display.

According to an embodiment of the disclosure, the electronic device 101 may transmit only screen information on the pop-up screen 1361 to the external electronic device 104. According to an embodiment of the disclosure, the electronic device 101 may not transmit screen information on the region 1360 other than the pop-up screen 1361 to the external electronic device 104.

According to an embodiment of the disclosure, the external electronic device 104 may display a screen 1362 corresponding to the pop-up screen 1361 displayed on the display of the electronic device 101, based on the screen information received from the electronic device 101.

Figure 14:
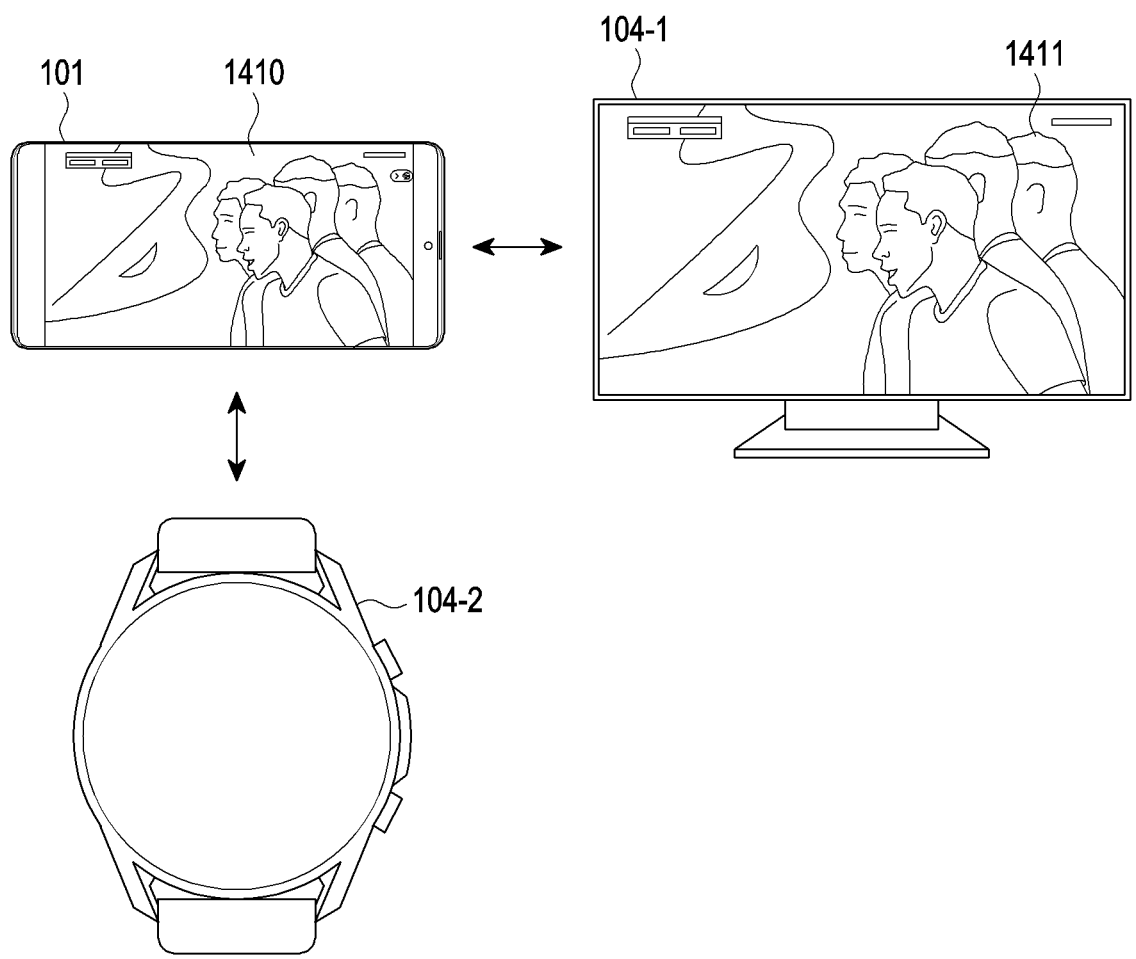
FIG. 14 is a diagram illustrating an operation in which an electronic device performs mirroring with a first external device while being connected to a second external device according to an embodiment of the disclosure.

FIG. 14 is a diagram illustrating an operation in which an electronic device performs mirroring with a first external device while being connected to a second external device according to an embodiment of the disclosure.

Figure 15:
FIG. 15 is a diagram illustrating a user interface displayed on a second external device when an event occurs according to an embodiment of the disclosure.

FIG. 15 is a diagram illustrating a user interface displayed on a second external device when an event occurs according to an embodiment of the disclosure.

Figure 16:
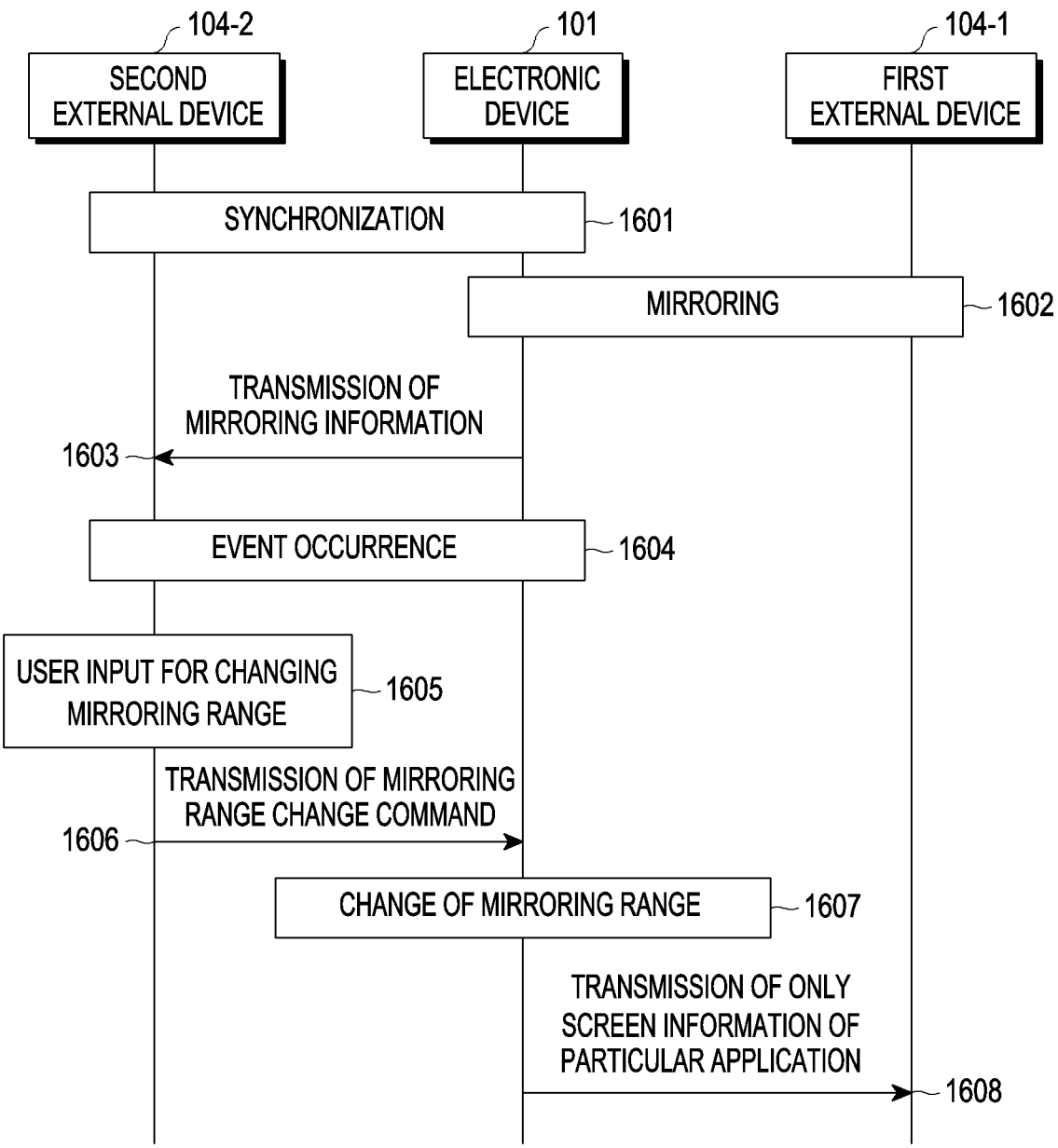
FIG. 16 is a flowchart illustrating an operation of changing a mirroring range with a first external device via a second external device at the time of event occurrence according to an embodiment of the disclosure.

FIG. 16 is a flowchart illustrating an operation of changing a mirroring range with a first external device via a second external device at the time of event occurrence according to an embodiment of the disclosure.

Referring to FIGS. 14 and 16, in operation 1601, an electronic device 101 (e.g., the electronic device 101 in FIG. 1 or the processor 120 in FIG. 1) may be synchronized with a second external device 104-2 (e.g., the electronic device 104 in FIG. 1) via a communication module (e.g., the communication module 190 in FIG. 1). According to an embodiment of the disclosure, the second external device 104-2 may be a mobile terminal (e.g., a smart watch) different from the electronic device 101. According to an embodiment of the disclosure, the electronic device 101 and the second external device 104-2 may perform mutual information sharing and/or mutual control.

According to an embodiment of the disclosure, in operation 1602, the electronic device 101 may mirror a screen 1410 displayed on a display (e.g., the display module 160 in FIG. 1) to a first external device 104-1 (e.g., the electronic device 104 in FIG. 1). According to an embodiment of the disclosure, the first external device 104-1 may display a screen 1411 corresponding to the screen 1410 displayed on the electronic device 101, based on screen information on the screen 1410 received from the electronic device 101.

FIG. 16 has illustrated that mirroring between the electronic device 101 and the first external device 104-1 is performed after a synchronization operation between the electronic device 101 and the second external device 104-2. However, according to an embodiment of the disclosure, synchronization between the electronic device 101 and the second external device 104-2 may be performed after mirroring between the electronic device 101 and the first external device 104-1.

According to an embodiment of the disclosure, in operation 1603, the electronic device 101 may transmit mirroring information relating to the first external device 104-1 to the second external device 104-2. According to an embodiment of the disclosure, the mirroring information may include information on the second external device 104-2 that is subject to mirroring, and/or information on a mirroring range (e.g., the entire display).

According to an embodiment of the disclosure, in operation 1604, when an event occurs in the electronic device 101 and/or the second external device 104-2, the second external device 104-2 may display a control screen as illustrated in FIG. 15. According to an embodiment of the disclosure, the event may be reception of a new message and/or a new mail.

Referring to FIG. 15, while the electronic device (e.g., the electronic device 101 in FIG. 1 or the electronic device 101 in FIG. 14) performs mirroring with the first external device (e.g., the electronic device 104 in FIG. 1 or the first external device 104-1 in FIG. 14), when an event of receiving a new message and/or a new mail has occurred in the electronic device and/or the second external device (e.g., the electronic device 104 in FIG. 1 or the second external device 104-2 in FIG. 14), the second external device may display a control screen 1510 related to the event.

According to an embodiment of the disclosure, the control screen 1510 may include a simple answer (e.g., Yes, thank you.) for the new message and/or the new mail, a command (e.g., control with phone) for controlling with the electronic device, and/or a command 1511 (e.g., mirroring only screen being displayed now) for changing a mirroring range between the electronic device and the first external device.

According to an embodiment of the disclosure, in operation 1605, the second external device 104-2 may receive a user input for changing the mirroring range. According to an embodiment of the disclosure, the second external device 104-2 may receive a user input of selecting the command 1511 for changing the mirroring range between the electronic device and the first external device in the control screen 1510 illustrated in FIG. 15.

According to an embodiment of the disclosure, in operation 1606, the second external device 104-2 may transmit a mirroring range change command to the electronic device 101. According to an embodiment of the disclosure, the mirroring range change command may be made for changing the mirroring range between the electronic device 101 and the first external device 104-1 from a full screen to an execution screen of a particular application (e.g., an application being displayed).

According to an embodiment of the disclosure, in operation 1607, the electronic device 101 may change the mirroring range. According to an embodiment of the disclosure, the electronic device 101 may change an execution screen of an application being displayed in full screen to a pop-up screen.

According to an embodiment of the disclosure, in operation 1608, the electronic device 101 may transmit only screen information on a particular application to the first external device 104-1 for mirroring. According to an embodiment of the disclosure, the electronic device 101 may transmit only information on the execution screen of the application displayed on the pop-up screen to the first external device 104-1.

According to an embodiment of the disclosure, an electronic device (e.g., the electronic device 101 in FIG. 1) may include a communication module (e.g., the communication module 190 in FIG. 1), a display (e.g., the display module 160 in FIG. 1), and at least one processor (e.g., the processor 120 in FIG. 1) operatively connected to the communication module and the display.

According to an embodiment of the disclosure, the at least one processor may identify whether at least one configured condition is satisfied, based on that an event has occurred, in a state where full screen information on, for mirroring, a full screen (e.g., the screen 410 in FIG. 4, the screen 1010 in FIG. 10, the screen 1210 in FIG. 12, or the screen 1310 in FIG. 13) displayed on the display is transmitted to an external device via the communication module.

According to an embodiment of the disclosure, the at least one processor may, based on that the at least one configured condition is satisfied, transmit, to the external device (e.g., the electronic device 104 in FIG. 1, the first external device 104-1 in FIG. 14, or the first external device 104-1 in FIG. 16), information on an execution screen (e.g., the pop-up screen 421 in FIG. 4, the pop-up screen 1021 in FIG. 10, the pop-up screen 1251 in FIG. 12, or the pop-up screen 1361 in FIG. 13) of at least one application among execution screens of applications being displayed on the display, in replacement of the full screen information so as to mirror only the execution screen of the application.

According to an embodiment of the disclosure, the electronic device may further include a memory (e.g., the memory 130 in FIG. 1).

According to an embodiment of the disclosure, the at least one processor may identify that the at least one configured condition is satisfied, based on that information on a sender of a message or a mail related to the event matches information on a contact stored in the memory.

According to an embodiment of the disclosure, the at least one processor may identify that the at least one configured condition is satisfied, based on that there is a history of contacting a sender of a message or a mail related to the event within a configured period before the occurrence of the event.

According to an embodiment of the disclosure, the at least one processor may receive information on people in front of the external device, which is obtained via a camera of the external device, from the external device via the communication module, based on that the event has occurred.

According to an embodiment of the disclosure, the at least one processor may identify that the at least one configured condition is satisfied, based on that the number of the people is a configured value or greater and/or a person with a low intimacy level is included therein, based on the information on the people.

According to an embodiment of the disclosure, the at least one processor may identify that the at least one configured condition is satisfied, based on that a user input related to the event is out of the execution screen of the application being displayed.

According to an embodiment of the disclosure, the at least one processor may identify that the at least one configured condition is satisfied, based on that a pre-configured number of events have consecutively occurred, in a state where notification is configured not to be displayed during a mirroring operation.

According to an embodiment of the disclosure, the external device may be a first external device (e.g., the electronic device 104 in FIG. 1, the first external device 104-1 in FIG. 14, or the first external device 104-1 in FIG. 16).

According to an embodiment of the disclosure, the at least one processor may identify that the at least one configured condition is satisfied, based on that a command for mirroring only the execution screen of the application being displayed on the display to the first external device is received from a second external device (e.g., the electronic device 104 in FIG. 1, the second external device 104-2 in FIG. 14, or the second external device 104-2 in FIG. 16) connected via the communication module after the occurrence of the event.

According to an embodiment of the disclosure, the at least one processor may transmit a screen (e.g., the screen 1010 in FIG. 10 or the screen 1310 in FIG. 13) including a notification (e.g., the notification 1011 in FIG. 10 or the notification 1320 in FIG. 13) to the external device, based on that the event has occurred, in a state where notification is configured to be displayed during a mirroring operation.

According to an embodiment of the disclosure, the at least one processor may transmit the information on the execution screen of the application being displayed on the display to the external device so as to mirror only the execution screen of the application.

According to an embodiment of the disclosure, the at least one processor may display a user interface (e.g., the user interface 1230 in FIG. 12 or the user interface 1340 in FIG. 13) that recommends to mirror only the execution screen of the application being displayed on the display, based on that the at least one configured condition is satisfied.

According to an embodiment of the disclosure, the at least one processor may transmit, based on that a user input for mirroring only the execution screen of the application being displayed on the display is received through the user interface, the information on the execution screen of the application to the external device in replacement of the full screen information.

According to an embodiment of the disclosure, the at least one processor may change the execution screen of the application being displayed as the full screen to a pop-up screen (e.g., the pop-up screen 421 in FIG. 4, the pop-up screen 1021 in FIG. 10, the pop-up screen 1251 in FIG. 12, or the pop-up screen 1361 in FIG. 13), based on that the at least one configured condition is satisfied.

According to an embodiment of the disclosure, the at least one processor may transmit only the information on the execution screen of the application displayed on the pop-up screen to the external electronic device.

According to an embodiment of the disclosure, a method of controlling an electronic device may include, in a state where full screen information on, for mirroring, a full screen displayed on a display is transmitted to an external device via a communication module, identifying whether at least one configured condition is satisfied, based on that an event has occurred.

According to an embodiment of the disclosure, the method of controlling the electronic device may include, based on that the at least one configured condition is satisfied, transmitting, to the external device, information on an execution screen of at least one application among execution screens of applications being displayed on the display, in replacement of the full screen information so as to mirror only the execution screen of the application.

According to an embodiment of the disclosure, the identifying of whether the at least one configured condition is satisfied may include identifying that the at least one configured condition is satisfied, based on that information on a sender of a message or a mail related to the event matches information on a contact stored in a memory.

According to an embodiment of the disclosure, the identifying of whether the at least one configured condition is satisfied may include identifying that the at least one configured condition is satisfied, based on that there is a history of contacting a sender of a message or a mail related to the event within a configured period before the occurrence of the event.

According to an embodiment of the disclosure, the identifying of whether the at least one configured condition is satisfied may include receiving information on people in front of the external device, which is obtained via a camera of the external device, from the external device via the communication module, based on that the event has occurred.

According to an embodiment of the disclosure, the identifying of whether the at least one configured condition is satisfied may include identifying that the at least one configured condition is satisfied, based on that the number of the people is a configured value or greater and/or a person with a low intimacy level is included therein, based on the information on the people.

According to an embodiment of the disclosure, the identifying of whether the at least one configured condition is satisfied may include identifying that the at least one configured condition is satisfied, based on that a user input related to the event is out of the execution screen of the application being displayed.

According to an embodiment of the disclosure, the identifying of whether the at least one configured condition is satisfied may include, in a state where notification is configured not to be displayed during a mirroring operation, identifying that the at least one configured condition is satisfied, based on that a pre-configured number of events have consecutively occurred.

According to an embodiment of the disclosure, the external device may be a first external device.

According to an embodiment of the disclosure, the identifying of whether the at least one configured condition is satisfied may include identifying that the at least one configured condition is satisfied, based on that a command for mirroring only the execution screen of the application being displayed on the display to the first external device is received from a second external device connected via the communication module after the occurrence of the event.

According to an embodiment of the disclosure, the method of controlling the electronic device may further include, in a state where notification is configured to be displayed during a mirroring operation, transmitting a screen including a notification to the external device, based on that the event has occurred.

According to an embodiment of the disclosure, the transmitting of the information on the execution screen of the application to the external device may include, after transmitting the screen including the notification to the external device, transmitting the information on the execution screen of the application being displayed on the display to the external device so as to mirror only the execution screen of the application.

According to an embodiment of the disclosure, the method of controlling the electronic device may further include displaying a user interface that recommends to mirror only the execution screen of the application being displayed on the display, based on that the at least one configured condition is satisfied.

According to an embodiment of the disclosure, the transmitting of the information on the execution screen of the application to the external device may include, based on that a user input for mirroring only the execution screen of the application being displayed on the display is received through the user interface, transmitting the information on the execution screen of the application to the external device in replacement of the full screen information.

According to an embodiment of the disclosure, the method of controlling the electronic device may further include changing the execution screen of the application being displayed as the full screen to a pop-up screen, based on that the at least one configured condition is satisfied.

According to an embodiment of the disclosure, the transmitting of the information on the execution screen of the application to the external device may include transmitting only the information on the execution screen of the application displayed on the pop-up screen to the external electronic device.

According to an embodiment of the disclosure, in a non-transitory computer-readable recording medium for storing one or more programs, the one or more programs may include instructions causing the electronic device to, in a state where full screen information on, for mirroring, a full screen displayed on the display is transmitted to an external device via the communication module, identify whether at least one configured condition is satisfied, based on that an event has occurred.

According to an embodiment of the disclosure, the one or more programs may include instructions causing the electronic device to, based on that the at least one configured condition is satisfied, transmit, to the external device, information on an execution screen of at least one application among execution screens of applications being displayed on the display, in replacement of the full screen information so as to mirror only the execution screen of the application.

According to an embodiment of the disclosure, the electronic device may further include a memory.

According to an embodiment of the disclosure, the one or more programs may include instructions causing the electronic device to identify that the at least one configured condition is satisfied, based on that information on a sender of a message or a mail related to the event matches information on a contact stored in the memory.

According to an embodiment of the disclosure, the one or more programs may include instructions causing the electronic device to identify that the at least one configured condition is satisfied, based on that there is a history of contacting a sender of a message or a mail related to the event within a configured period before the occurrence of the event.

According to an embodiment of the disclosure, the one or more programs may include instructions causing the electronic device to receive information on people in front of the external device, which is obtained via a camera of the external device, from the external device via the communication module, based on that the event has occurred.

According to an embodiment of the disclosure, the one or more programs may include instructions causing the electronic device to identify that the at least one configured condition is satisfied, based on that the number of the people is a configured value or greater and/or a person with a low intimacy level is included therein, based on the information on the people.

According to an embodiment of the disclosure, the one or more programs may include instructions causing the electronic device to identify that the at least one configured condition is satisfied, based on that a user input related to the event is out of the execution screen of the application being displayed.

According to an embodiment of the disclosure, the one or more programs may include instructions causing the electronic device to, in a state where notification is configured not to be displayed during a mirroring operation, identify that the at least one configured condition is satisfied, based on that a pre-configured number of events have consecutively occurred.

According to an embodiment of the disclosure, the external device may be a first external device.

According to an embodiment of the disclosure, the one or more programs may include instructions causing the electronic device to identify that the at least one configured condition is satisfied, based on that a command for mirroring only the execution screen of the application being displayed on the display to the first external device is received from a second external device connected via the communication module after the occurrence of the event.

According to an embodiment of the disclosure, the one or more programs may include instructions causing the electronic device, in a state where notification is configured to be displayed during a mirroring operation, transmit a screen including a notification to the external device, based on that the event has occurred.

According to an embodiment of the disclosure, the one or more programs may include instructions causing the electronic device to transmit the information on the execution screen of the application being displayed on the display to the external device so as to mirror only the execution screen of the application.

According to an embodiment of the disclosure, the one or more programs may include instructions causing the electronic device to display a user interface that recommends to mirror only the execution screen of the application being displayed on the display, based on that the at least one configured condition is satisfied.

According to an embodiment of the disclosure, the one or more programs may include instructions causing the electronic device to, based on that a user input for mirroring only the execution screen of the application being displayed on the display is received through the user interface, transmit the information on the execution screen of the application to the external device in replacement of the full screen information.

According to an embodiment of the disclosure, the one or more programs may include instructions causing the electronic device to change the execution screen of the application being displayed as the full screen to a pop-up screen, based on that the at least one configured condition is satisfied.

According to an embodiment of the disclosure, the one or more programs may include instructions causing the electronic device to transmit only the information on the execution screen of the application displayed on the pop-up screen to the external electronic device.

The electronic device according to embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to embodiments of the disclosure, each component (e.g., a module or a program) of the above-described components may include a single entity or multiple entities, and some of the multiple entities may be separately disposed in different components. According to embodiments of the disclosure, one or more of the above-described components may be omitted, or one or more other components may be added. Alternatively or additionally, a plurality of components (e.g., modules or programs) may be integrated into a single component. In such a case, according to embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
communication circuitry;
a display;
at least one processor; and
memory storing instructions that, when executed by the at least one processor, cause the electronic device to:
synchronize the electronic device with an external device,
transmit, through the communication circuitry, first mirroring information to the external device for mirroring a first execution screen of an application displayed on the display in a first size,
while the first execution screen of the application is displayed on the display in the first size, identify an occurrence of a notification event,
based on the occurrence of the notification event, determine whether a notification is allowed during the mirroring,
based on determining that the notification is allowed, determine whether at least one configured condition for changing a size of the first execution screen from the first size to a second size is satisfied,
receive, from the external device, a mirroring control command,
based on the at least one configured condition being satisfied, change the size of the first execution screen from the first size to the second size smaller than the first size and display the first execution screen in the second size according to the mirroring control command, wherein the first execution screen displayed in the second size is displayed as a pop-up screen in a partial area of the display, and
while the pop-up screen is displayed on the display, transmit, to the external device, second mirroring information for mirroring only the first execution screen displayed in the second size without mirroring the notification, in replacement of the first mirroring information, so that the external device continues to mirror only the first execution screen displayed on the partial area of the display.

2. The electronic device of claim 1,
wherein the instructions, when executed by the at least one processor, cause the electronic device to identify that the at least one configured condition is satisfied, based on that information on a sender of a message or a mail related to the notification event matches information on a contact stored in the memory.

3. The electronic device of claim 1, wherein the instructions, when executed by the at least one processor, cause the electronic device to identify that the at least one configured condition is satisfied, based on that there is a history of contacting a sender of a message or a mail related to the notification event within a configured period before an occurrence of the notification event.

4. The electronic device of claim 1, wherein the instructions, when executed by the at least one processor, cause the electronic device to:
based on the notification event occurring, receive information on people in front of the external device, which is obtained via a camera of the external device, from the external device via the communication circuitry, and
based on the information on the people, identify that the at least one configured condition is satisfied, based on that a number of the people is a configured value or greater and/or a person with a low intimacy level is included therein.

5. The electronic device of claim 1, wherein the instructions, when executed by the at least one processor, cause the electronic device to identify that the at least one configured condition is satisfied, based on a user input related to the notification event being out of the first execution screen being displayed in the first size.

6. The electronic device of claim 1, wherein the instructions, when executed by the at least one processor, cause the electronic device to, in a state that notification is configured not to be displayed during a mirroring operation, identify that the at least one configured condition is satisfied, based on a pre-configured number of events consecutively occurring.

7. The electronic device of claim 1, wherein the instructions, when executed by the at least one processor, cause the electronic device to:
in a state that notification is configured to be displayed during a mirroring operation, transmit a screen including the notification to the external device, based on the notification event occurring, and
transmit the second mirroring information to the external device.

8. The electronic device of claim 1, wherein the instructions, when executed by the at least one processor, cause the electronic device to:
based on the at least one configured condition being satisfied, display a user interface that recommends to mirror only the first execution screen being displayed on the partial area of the display, and
based on a user input for mirroring only the first execution screen being displayed on the display being received through the user interface, transmit the second mirroring information to the external device in replacement of the first mirroring information.

9. A non-transitory storage medium storing one or more program, the one or more program comprising computer-executable instructions, when executed by at least one processor of an electronic device, cause the electronic device to:
synchronize the electronic device with an external device;
transmit, through communication circuitry of the electronic device, first mirroring information to the external device for mirroring a first execution screen of an application displayed on the display in a first size;
while the first execution screen of the application is displayed on the display in the first size, identify an occurrence of a notification event;
based on the occurrence of the notification event, determine whether a notification is allowed during the mirroring;
based on determining that the notification is allowed, determine whether at least one configured condition for changing a size of the first execution screen from the first size to a second size is satisfied;
receive, from the external device, a mirroring control command;
based on the at least one configured condition being satisfied, change the size of the first execution screen from the first size to the second size smaller than the first size and display the first execution screen in the second size according to the mirroring control command, wherein the first execution screen displayed in the second size is displayed as a pop-up screen in a partial area of the display; and while the pop-up screen is displayed on the display, transmit, to the external device, a second mirroring information for mirroring only the first execution screen displayed in the second size displayed in the second size without mirroring the notification, in replacement of the first mirroring information, so that the external device continues to mirror only the first execution screen displayed on the partial area of the display.

10. The non-transitory storage medium of claim 9, wherein the instructions cause the electronic device to identify that the at least one configured condition is satisfied, based on that information on a sender of a message or a mail related to the notification event matches information on a contact stored in a memory.

11. The non-transitory storage medium of claim 9, wherein the instructions cause the electronic device to identify that the at least one configured condition is satisfied, based on that there is a history of contacting a sender of a message or a mail related to the notification event within a configured period before an occurrence of the notification event.

12. The non-transitory storage medium of claim 9, wherein the instructions cause the electronic device to:
based on the notification event occurring, receive information on people in front of the external device, which is obtained via a camera of the external device, from the external device via the communication circuitry; and
based on the information on the people, identify that the at least one configured condition is satisfied, based on that a number of the people is a configured value or greater and/or a person with a low intimacy level is included therein.

13. The non-transitory storage medium of claim 9, wherein the instructions cause the electronic device to identify that the at least one configured condition is satisfied, based on a user input related to the notification event being out of the first execution screen being displayed.

14. The non-transitory storage medium of claim 9, wherein the instructions cause the electronic device to, in a state that notification is configured not to be displayed during a mirroring operation, identify that the at least one configured condition is satisfied, based on a pre-configured number of events consecutively occurring.

15. The non-transitory storage medium of claim 9, wherein the instructions cause the electronic device to:
in a state that notification is configured to be displayed during a mirroring operation, transmit a screen including a notification to the external device, based on the notification event occurring,
wherein the transmitting of the second mirroring information comprises, after transmitting the screen including the notification to the external device, transmit the second mirroring information to the external device.

16. The non-transitory storage medium of claim 9, wherein the instructions cause the electronic device to:
based on the at least one configured condition being satisfied, display a user interface that recommends to mirror only the first execution screen being displayed on the partial area of the display,
wherein the transmitting of the second mirroring information comprises, based on a user input for mirroring only the first execution screen being displayed on the partial area of the display being received through the user interface, transmit the second mirroring information to the external device in replacement of the first mirroring information.

* * * * *